(12) United States Patent
Tsuchizawa

(10) Patent No.: US 11,390,357 B2
(45) Date of Patent: Jul. 19, 2022

(54) HUMAN-POWERED VEHICLE CONTROL DEVICE

(71) Applicant: Shimano Inc., Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 520 days.

(21) Appl. No.: 16/353,344

(22) Filed: Mar. 14, 2019

(65) Prior Publication Data

US 2019/0291813 A1 Sep. 26, 2019

(30) Foreign Application Priority Data

Mar. 22, 2018 (JP) .............................. JP2018-054911

(51) Int. Cl.
*B62M 6/50* (2010.01)
*B62M 6/55* (2010.01)
*B60L 15/20* (2006.01)

(52) U.S. Cl.
CPC .............. *B62M 6/50* (2013.01); *B60L 15/20* (2013.01); *B62M 6/55* (2013.01)

(58) Field of Classification Search
CPC .......... B62M 6/50; B62M 6/55; B62M 25/08; B62M 6/45; B60L 15/20; B60L 2200/12; B60L 50/60; B60L 50/20; B60L 3/0038; B60L 3/0092; Y02T 10/70; Y02T 10/72; Y02T 10/64; B62K 25/00; B62J 1/08; B62J 2001/085

See application file for complete search history.

(56) References Cited

U.S. PATENT DOCUMENTS

| 5,505,277 | A | * | 4/1996 | Suganuma | ............... B62M 6/45 |
| | | | | | 180/206.3 |
| 5,777,442 | A | * | 7/1998 | Miyata | ..................... B62M 6/55 |
| | | | | | 318/2 |
| 5,909,781 | A | * | 6/1999 | Yonekawa | ............... B62M 6/45 |
| | | | | | 180/206.4 |
| 5,992,553 | A | * | 11/1999 | Morrison | ................. B62M 6/45 |
| | | | | | 180/206.2 |
| 6,073,717 | A | * | 6/2000 | Yamamoto | ............... B62M 6/45 |
| | | | | | 180/206.4 |
| 6,545,437 | B1 | * | 4/2003 | Strothmann | .......... B62B 5/0026 |
| | | | | | 180/206.2 |

(Continued)

FOREIGN PATENT DOCUMENTS

| CN | 1765692 A | 5/2006 |
| CN | 107128428 A | 9/2017 |

(Continued)

*Primary Examiner* — Richard M Camby
(74) *Attorney, Agent, or Firm* — Global IP Counselors, LLP

(57) ABSTRACT

A human-powered vehicle control device includes an electronic controller configured to control a human-powered vehicle component included in a human-powered vehicle in accordance with a human driving force. The electronic controller controls the human-powered vehicle component in accordance with a first value and a second value. The first value relates to the human driving force or a driving force of the human-powered vehicle obtained using a first sensor. The second value relates to the human driving force or the driving force of the human-powered vehicle obtained using a second sensor, which differs from the first sensor.

10 Claims, 12 Drawing Sheets

(56) References Cited

U.S. PATENT DOCUMENTS

| | | | | |
|---|---|---|---|---|
| 8,666,581 | B2* | 3/2014 | Suzuki | B62M 6/45 |
| | | | | 701/22 |
| 9,327,801 | B2* | 5/2016 | Arimune | B62M 6/50 |
| 10,479,442 | B2* | 11/2019 | Baumgaertner | B62M 6/45 |
| 2003/0024750 | A1* | 2/2003 | Ligman | B60L 50/20 |
| | | | | 180/65.22 |
| 2014/0166383 | A1 | 6/2014 | Arimune | |
| 2016/0101827 | A1 | 4/2016 | Usui et al. | |
| 2016/0121730 | A1 | 5/2016 | Fujita et al. | |
| 2017/0282919 | A1 | 10/2017 | Schieffelin | |
| 2018/0056812 | A1 | 3/2018 | Hamann | |

FOREIGN PATENT DOCUMENTS

| | | |
|---|---|---|
| CN | 103373433 B | 10/2017 |
| CN | 107499446 A | 12/2017 |
| DE | 10 2015 016 263 A1 | 6/2017 |
| EP | 3 251 939 A1 | 12/2017 |
| JP | 7-33069 A | 2/1995 |
| JP | 9-39873 A | 2/1997 |
| JP | 9-249185 A | 9/1997 |
| JP | 10-59260 A | 3/1998 |
| JP | 11-29086 A | 2/1999 |
| JP | 4518298 B2 | 8/2010 |
| JP | 4518299 B2 | 8/2010 |
| JP | 4518300 B2 | 8/2010 |
| JP | 4518301 B2 | 8/2010 |
| JP | 4608764 B2 | 1/2011 |
| JP | 2013-530861 A | 8/2013 |
| JP | 2014-133552 A | 7/2014 |
| JP | 2016-74407 A | 5/2016 |
| JP | 2016-101761 A | 6/2016 |

\* cited by examiner

HUMAN-POWERED VEHICLE CONTROL DEVICE

CROSS-REFERENCE TO RELATED APPLICATIONS

This application claims priority to Japanese Patent Application No. 2018-054911, filed on Mar. 22, 2018. The entire disclosure of Japanese Patent Application No. 2018-054911 is hereby incorporated herein by reference.

BACKGROUND

Technical Field

The present invention generally relates to a human-powered vehicle control device.

Background Information

Japanese Laid-Open Patent Publication No. 10-59260 (Patent document 1) describes an example of a human-powered vehicle control device that controls a human-powered vehicle component in accordance with an output of a detection unit.

SUMMARY

One object of the present disclosure to provide a human-powered vehicle control device capable of suitably controlling a human-powered vehicle component.

A human-powered vehicle control device in accordance with a first aspect of the present disclosure comprises an electronic controller configured to control a human-powered vehicle component included in a human-powered vehicle in accordance with a human driving force. The electronic controller is configured to control the human-powered vehicle component in accordance with a first value and a second valve. The first value is related to one of the human driving force and a driving force of the human-powered vehicle obtained using a first sensor. The second value is related to one of the human driving force and the driving force of the human-powered vehicle obtained using a second sensor, which differs from the first sensor.

In accordance with the human-powered vehicle control device of the first aspect, the human-powered vehicle component is controlled in accordance with the first value and the second value related to the human driving force or the driving force of the human-powered vehicle obtained using different sensors. Thus, the human-powered vehicle component is suitably controlled as compared with a case where the human-powered vehicle component is controlled in accordance with only one of the first value and the second value.

In accordance with a second aspect of the present disclosure, the human-powered vehicle control device according to the first aspect is configured so that the first sensor includes a torque sensor that detects a torque input to a crank of the human-powered vehicle, and the second sensor includes at least one of a wind sensor that detects at least one of wind speed and wind pressure, an acceleration sensor that detects acceleration of the human-powered vehicle, a vehicle speed sensor that detects vehicle speed of the human-powered vehicle, and an inclination sensor that detects tilt of the human-powered vehicle.

In accordance with the human-powered vehicle control device of the second aspect, the first value can be obtained using a crank torque sensor for detecting the torque input to the crank of the human-powered vehicle. The second value can be obtained using at least one of the wind sensor for detecting at least one of wind speed and wind pressure, the acceleration sensor for detecting the acceleration of the human-powered vehicle, the vehicle speed sensor for detecting the vehicle speed of the human-powered vehicle, and the inclination sensor for detecting the tilt of the human-powered vehicle.

A human-powered vehicle control device in accordance with a third aspect of the present disclosure comprises an electronic controller configured to control a human-powered vehicle component included in a human-powered vehicle in accordance with a travel resistance. The electronic controller is configured to control the human-powered vehicle component in accordance with a first value and a second value. The first value is related to the travel resistance obtained using the first sensor. The second value is related to the travel resistance obtained using a second sensor, which differs from the first sensor.

In accordance with the human-powered vehicle control device of the third aspect, the human-powered vehicle component is controlled in accordance with the first value and the second value related to the travel resistance obtained using different sensors. Thus, the human-powered vehicle component is suitably controlled as compared with a case where the human-powered vehicle component is controlled in accordance with only one of the first value and the second value.

In accordance with a fourth aspect of the present disclosure, the human-powered vehicle control device according to the third aspect is configured so that the first sensor includes a crank torque sensor that detects a torque input to a crank of the human-powered vehicle, a vehicle speed sensor that detects a vehicle speed of the human-powered vehicle, and a crank rotation sensor that detects a rotational speed of the crank, and the second sensor includes at least one of a wind sensor that detects at least one of wind speed and wind pressure, an acceleration sensor that detects acceleration of the human-powered vehicle, a vehicle speed sensor that detects vehicle speed of the human-powered vehicle, and an inclination sensor that detects tilt of the human-powered vehicle.

In accordance with the human-powered vehicle control device of the fourth aspect, the first value can be obtained using the crank torque sensor for detecting the torque input to a crank of the human-powered vehicle, the vehicle speed sensor for detecting the vehicle speed of a human-powered vehicle, and the crank rotation sensor for detecting the rotational speed of the crank. The second value can be obtained using at least one of the wind sensor for detecting at least one of wind speed and wind pressure, the acceleration sensor for detecting the acceleration of the human-powered vehicle, the vehicle speed sensor for detecting the vehicle speed of the human-powered vehicle, and the inclination sensor for detecting the tilt of the human-powered vehicle.

In accordance with a fifth aspect of the present disclosure, the human-powered vehicle control device according to any one of the first to fourth aspects is configured so that the electronic controller is configured to control the human-powered vehicle component in accordance with a smaller one of the first value and the second value upon determining a difference of the first value and the second value is excluded from a predetermined range.

In accordance with the human-powered vehicle control device of the fifth aspect, in a case where an abnormality occurs in which at least one of the detection values of the first sensor and the second sensor is greatly deviated from the actual value, the human-powered vehicle component is suitably controlled.

In accordance with a sixth aspect of the present disclosure, the human-powered vehicle control device according to any one of the first to fourth aspects is configured so that, the electronic controller is configured not to operate the human-powered vehicle component in accordance with the first value and the second value upon determining a difference of the first value and the second value is excluded from a predetermined range.

In accordance with the human-powered vehicle control device of the sixth aspect, in a case where an abnormality occurs in which at least one of the detection values of the first sensor and the second sensor is greatly deviated from the actual value, execution of the control of the human-powered vehicle component that is in accordance with the detection value greatly deviated from the actual value is limited.

In accordance with a seventh aspect of the present disclosure, the human-powered vehicle control device according to any one of the first to fourth aspects is configured so that the electronic controller is configured to perform a predetermined operation with the human-powered vehicle component upon determining a difference of the first value and the second value is excluded from a predetermined range.

In accordance with the human-powered vehicle control device of the seventh aspect, the human-powered vehicle component is suitably controlled even in a case where an abnormality occurs in which at least one of the detection values of the first sensor and the second sensor is greatly deviated from the actual value.

In accordance with an eighth aspect of the present disclosure, the human-powered vehicle control device according to any one of the first to fourth aspects is configured so that the electronic controller is configured to control the human-powered vehicle component in accordance with a second value upon determining the first sensor has failed, and the electronic controller is configured to control the human-powered vehicle component in accordance with a first value upon determining the second sensor has failed.

In accordance with the human-powered vehicle control device of the eighth aspect, in a case where one of the first sensor and the second sensor has failed, the human-powered vehicle component is controlled in accordance with the other of the first sensor and the second sensor.

In accordance with a ninth aspect of the present disclosure, the human-powered vehicle control device according to any one of the first to fourth aspects is configured so that the electronic controller is configured not to operate the human-powered vehicle component in accordance with the first value and the second value upon determining the first sensor and the second sensor have failed.

In accordance with the human-powered vehicle control device of the ninth aspect, in a case where the first sensor and the second sensor both fails, execution of the control of the human-powered vehicle component that is in accordance with the detection value of the failed sensors is limited.

In accordance with a tenth aspect of the present disclosure, the human-powered vehicle control device according to any one of the first to fourth aspects is configured so that the electronic controller is configured to perform a predetermined operation with the human-powered vehicle component upon determining the first sensor and the second sensor have failed.

In accordance with the human-powered vehicle control device of the tenth aspect, even in a case where the first sensor and the second sensor both fail, the human-powered vehicle component can be suitably controlled.

In accordance with an eleventh aspect of the present disclosure, the human-powered vehicle control device according to any one of the first to tenth aspects is configured so that the electronic controller is configured to control the human-powered vehicle component in accordance with an average value of the first value and the second value.

In accordance with the human-powered vehicle control device of the eleventh aspect, the human-powered vehicle component is stably controlled as compared with a case where the human-powered vehicle component is controlled in accordance with only one of the first value and the second value.

A human-powered vehicle control device in accordance with a twelfth aspect of the present disclosure comprises an electronic controller configured to control a human-powered vehicle component included in a human-powered vehicle in accordance with an output of a wind sensor that detects at least one of wind speed and wind pressure. The electronic controller is configured not to operate the human-powered vehicle component in accordance with the output of the wind sensor upon determining the output of the wind sensor satisfies a predetermined condition.

In accordance with the human-powered vehicle control device of the twelfth aspect, in a case where the output of the sensor satisfies a predetermined condition, operation of the human-powered vehicle component in accordance with the output of the sensor is limited.

In accordance with a thirteenth aspect of the present disclosure, the human-powered vehicle control device according to the twelfth aspect is configured so that the predetermined condition includes a change amount of the output of the wind sensor within a first predetermined time being greater than or equal to a first change amount.

In accordance with the human-powered vehicle control device of the thirteenth aspect, in a case where the change amount of the output of the wind sensor within the first predetermined time is greater than or equal to the first change amount, there is a possibility that the sensor is not functioning normally. Thus, operation of the human-powered vehicle component in accordance with the output of the sensor is limited.

In accordance with a fourteenth aspect of the present disclosure, the human-powered vehicle control device according to the twelfth or thirteenth aspect is configured so that the predetermined condition includes that a change amount of the output of the wind sensor in a second predetermined time being smaller than or equal to a second change amount.

In accordance with the human-powered vehicle control device of the fourteenth aspect, in a case where the change amount of the output of the sensor in the second predetermined time is smaller than or equal to the second change amount, there is a possibility that the sensor is not functioning normally. Thus, operation of the human-powered vehicle component in accordance with the output of the sensor is limited.

In accordance with a fifteenth aspect of the present disclosure, the human-powered vehicle control device according to any one of the twelfth to fourteenth aspects is configured so that the predetermined condition includes the output of the sensor being greater than or equal to a predetermined value.

In accordance with the human-powered vehicle control device of the fifteenth aspect, in a case where the output of the sensor is greater than or equal to a predetermined value, there is a possibility that the sensor is not functioning normally. Thus, operation of the human-powered vehicle component in accordance with the output of the sensor is limited.

In accordance with a sixteenth aspect of the present disclosure, the human-powered vehicle control device according to any one of the twelfth to fifteenth aspects is configured so that the electronic controller is configured to control the human-powered vehicle component so that the human-powered vehicle component becomes a predetermined state upon determining the output of the sensor satisfies the predetermined condition.

In accordance with the human-powered vehicle control device of the sixteenth aspect, in a case where the output of the sensor satisfies a predetermined condition, the human-powered vehicle component is controlled so that the human-powered vehicle component becomes a predetermined state.

In accordance with a seventeenth aspect of the present disclosure, the human-powered vehicle control device according to any one of the first to sixteenth aspects is configured so that the human-powered vehicle component includes at least one of a motor that assists in propulsion of the human-powered vehicle, a transmission, a suspension, and an adjustable seatpost.

In accordance with the human-powered vehicle control device of the seventeenth aspect, the controller suitably controls at least one of the motor that assists the propulsion of the human-powered vehicle, the transmission, the suspension, and the adjustable seatpost.

The human-powered vehicle control device in accordance with the present disclosure can suitably control a human-powered vehicle component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 50 according to a first embodiment will now be described with reference to FIGS. 1 to 3. Hereinafter, the human-powered vehicle control device 50 will simply be referred to as the control device 50. The control device 50 is provided on the human-powered vehicle 10. The human-powered vehicle 10 is a vehicle that can be driven by at least a human driving force. The human-powered vehicle 10 includes, for example, a bicycle. The human-powered vehicle 10 also includes, for example, a unicycle and a vehicle having three or more wheels, and the number of wheels is not limited. The human-powered vehicle 10 includes, for example, a mountain bike, a road bike, a city bike, a cargo bike, and a recumbent bike. Hereinafter, the human-powered vehicle 10 will be described as a bicycle in the embodiment.

Figure 1:
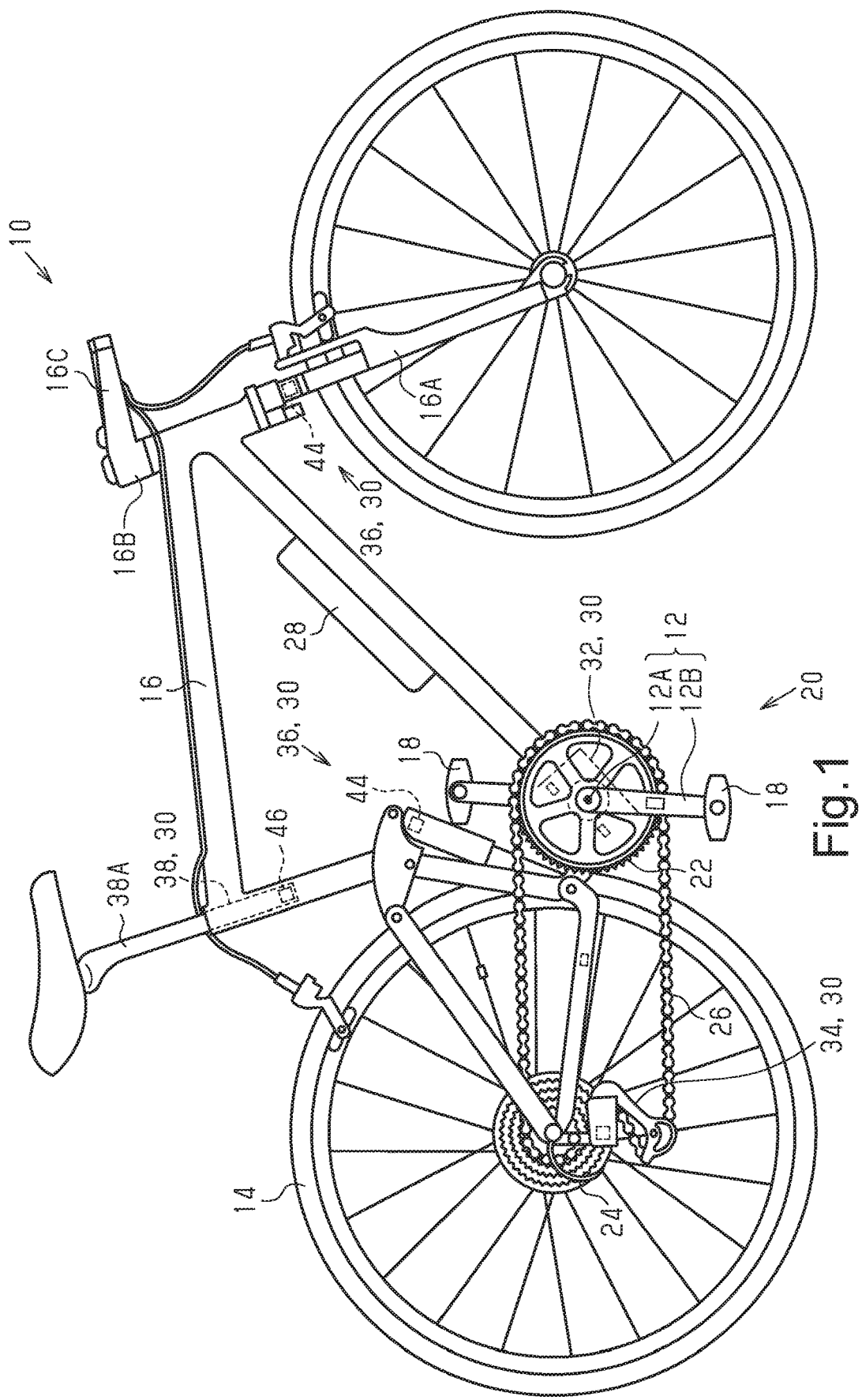
FIG. 1 is a side elevational view of a human-powered vehicle including a human-powered vehicle control device according to a first embodiment.

As shown in FIG. 1, the human-powered vehicle 10 includes a crank 12 and a drive wheel 14. The human-powered vehicle 10 further includes a frame 16. A human driving force H is input to the crank 12. The crank 12 includes a crankshaft 12A rotatable with respect to the frame 16 and a pair of crank arms 12B provided at both axial ends of the crankshaft 12A. A pedal 18 is connected to each of the crank arms 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured so rotate the first rotary body 22 forward in a case where the crank 12 rotates forward and not rotate the first rotary body 22 backward in a case where the crank 12 rotates backward. The first rotary body 22 includes a sprocket, a pulley, or a bevel gear. The drive mechanism 20 further includes a linking member 26 and a second rotary body 24. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. A second one-way clutch is preferably provided between the second rotary body 24 and the drive wheel 14. The second one-way clutch is configured to rotate the drive wheel 14 forward in a case where the second rotary body 24 rotates forward and not rotate the drive wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the following embodiment, the rear wheel will be described as the drive wheel 14 although the front wheel can serve as the drive wheel 14.

Figure 2:
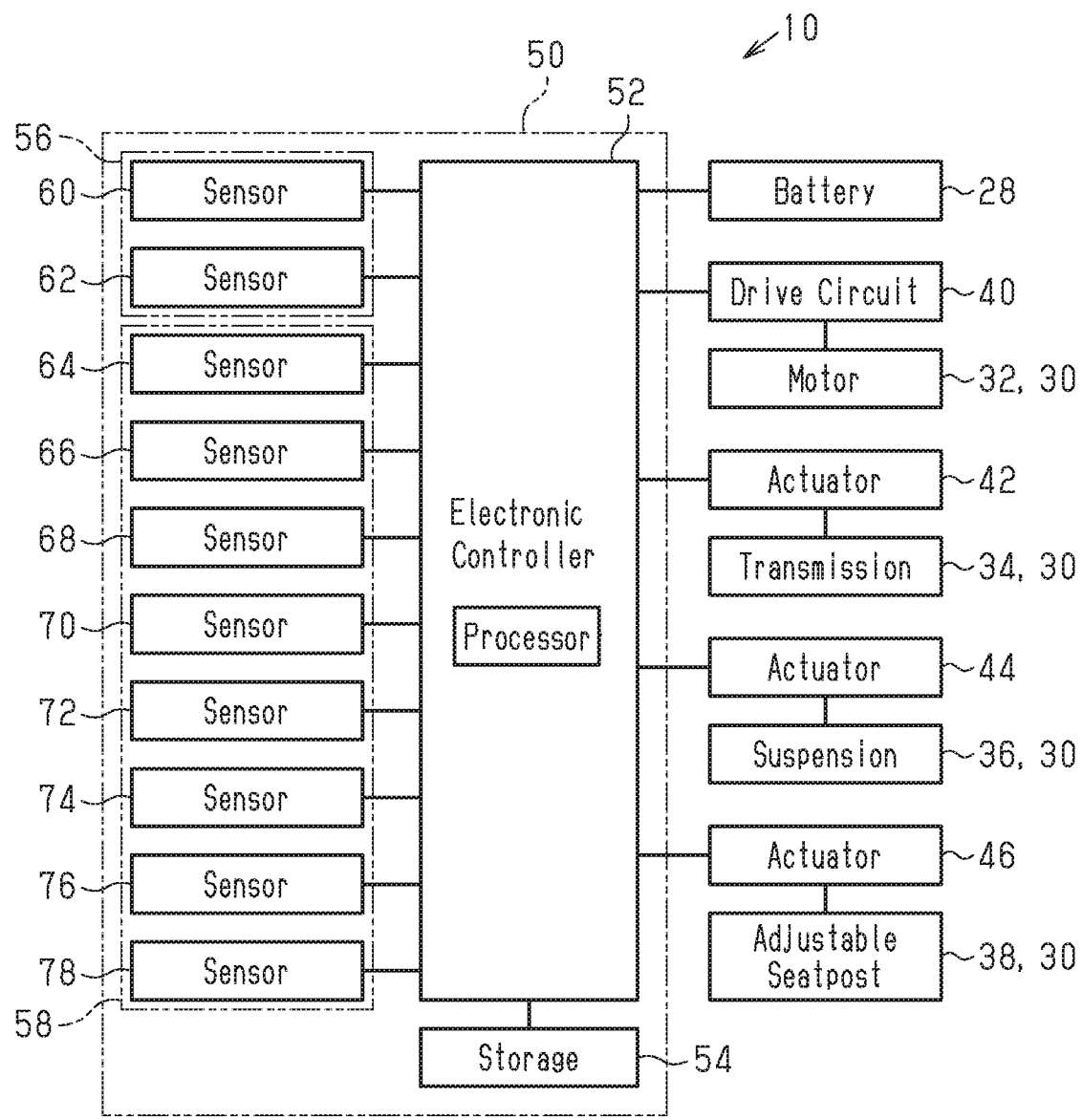
FIG. 2 is a block diagram showing an electrical configuration of the human-powered vehicle control device according to the first embodiment.

As shown in FIGS. 1 and 2, the human-powered vehicle 10 further includes a battery 28, and a human-powered vehicle component 30.

The battery 28 includes one or a plurality of battery cells. The battery cell includes a rechargeable battery. The battery 28 is provided on the human-powered vehicle 10 and supplies power to other electric parts, such as a motor 32 and the control device 50, which are electrically connected to the battery 28 by wire. The battery 28 is connected to an electronic controller 52 so that communication can be performed through wired connection or wireless connection. The electronic controller 52 will simply be referred to as the controller 52. The battery 28 is configured to communicate with the controller 52 through, for example, power line communication (PLC). The battery 28 can be attached to the outside of the frame 16 or can be at least partially accommodated in the frame 16.

The human-powered vehicle component 30 includes at least one of a motor 32, a transmission 34, a suspension 36, and an adjustable seatpost 38.

The motor 32 forms a drive unit together with a drive circuit 40. The motor 32 and the drive circuit 40 are preferably provided on the same housing. The drive circuit 40 controls the power supplied from the battery 28 to the motor 32. The drive circuit 40 is connected to the controller 52 of the control device 50 so that communication can be performed through wired connection or wireless connection. The drive circuit 40 is configured to communicate with the controller 52, for example, through serial communication. The drive circuit 40 drives the motor 32 in accordance with a control signal from the controller 52. The motor 32 assists in the propulsion of the human-powered vehicle 10. The motor 32 includes an electric motor. The motor 32 is provided in a power transmission path of the human driving force H extending from the pedals 18 to the rear wheel or provided so to transmit rotation to the front wheel. The motor 32 is provided on the frame 16, the rear wheel, or the front wheel of the human-powered vehicle 10. In the present embodiment, the motor 32 is coupled to a power transmission path from the crankshaft 12A to the first rotary body 22. A one-way clutch is preferably provided in the power transmission path between the motor 32 and the crankshaft 12A so that the motor 32 is not rotated by the rotational force of the crank 12 in a case where the crankshaft 12A is rotated in the direction in which the human-powered vehicle 10 moves forward. The housing provided with the motor 32 and the drive circuit 40 can be provided with elements other than the motor 32 and the drive circuit 40. For example, a speed reducer that decelerates and outputs the rotation of the motor 32 can be provided. The drive circuit 40 includes an inverter circuit.

The transmission 34, together with an actuator 42, forms a transmission device. The transmission 34 is used to change a transmission ratio B that is a ratio of the rotational speed of the drive wheel 14 to the rotational speed of the crank 12.

The transmission 34 is configured to change the transmission ratio B of the human-powered vehicle 10. The transmission 34 is configured to change the transmission ratio B in a stepwise manner. The actuator 42 performs a shift operation with the transmission 34. The transmission 34 is controlled by the controller 52. The actuator 42 is connected to the controller 52 so that communication can be performed through wired connection or wireless connection. The actuator 42 is configured to communicate with the controller 52, for example, through power line communication (PLC). The actuator 42 causes the transmission 34 to perform the shift operation in accordance with a control signal from the controller 52. The transmission 34 includes at least one of an internal transmission device and an external transmission device (derailleur).

The suspension 36 includes an actuator 44 configured to change at least one of hardness, damping rate, and height of the suspension 36. The suspension 36 includes at least one of a front suspension and a rear suspension. At least one of the hardness, the damping rate, and the length of the suspension 36 is different in a plurality of states of the suspension 36. The actuator 44 is connected to the controller 52 so that communication can be performed through wired connection or wireless connection. The actuator 44 is configured to communicate with the controller 52, for example, through power line communication.

The adjustable seatpost 38 includes an actuator 46 configured to change the height of a seatpost 38A. The actuator 46 can control a valve of the adjustable seatpost 38, which is extended by hydraulic pressure or air. The actuator 46 is connected to the controller 52 so that communication can be performed through wired connection or wireless connection. The actuator 46 is configured to communicate with the controller 52, for example, through power line communication. The actuator 42, the actuator 44, and the actuator 46 include an electric motor or a solenoid.

As shown in FIG. 2, the control device 50 includes the controller 52. In the present embodiment, the control device 50 further includes a storage 54. In the present embodiment, the control device 50 further includes a first sensor 56 and a second sensor 58.

The controller 52 includes at least one processor that performs a predetermined control program. The processor is, for example, a central processing unit (CPU) or a micro-processing unit (MPU). The controller 52 can include one or more microcomputers. The controller 52 can include a plurality of processors located at different positions. The terms "controller" and "electronic controller" as used herein refer to hardware that executes a software program and does not include a human. The storage 54 stores various control programs and information used for various control processes. The storage 54 includes any computer storage device or any non-transitory computer-readable medium with the sole exception of a transitory, propagating signal. For example, the storage 54 includes a nonvolatile memory and a volatile memory. The controller 52 and the storage 54 are, for example, provided on the housing in which the motor 32 is provided. The controller 52 can include the drive circuit 40.

The first sensor 56 includes a torque sensor 60 that detects a torque input to the crank 12 of the human-powered vehicle 10. The first sensor 56 is connected to the controller 52 of the control device 50 so that communication can be performed through wired connection or wireless connection. The first sensor 56 can be used to detect a power WH of the human driving force H. In a case where the power WH of the human driving force H is detected using the first sensor 56, the first sensor 56 can include the torque sensor 60 and a crank rotation sensor 62 for detecting a rotational speed N of the crank 12.

The torque sensor 60 is used to detect the torque TH of the human driving force H. The torque sensor 60 can be any suitable torque sensor that can produce a signal that is indicative of a torque of the human driving force H. The torque sensor 60 is connected to the controller 52 of the control device 50 so that communication can be performed through wired connection or wireless connection. The torque sensor 60 can be any suitable torque sensor. The torque sensor 60 is provided, for example, in the housing in which the motor 32 is provided. The torque sensor 60 detects the torque TH of the human driving force H input to the crank 12. For example, in a case where the first one-way clutch is provided in the power transmission path, the torque sensor 60 is provided on the upstream side of the first one-way clutch. The torque sensor 60 includes a strain sensor, a magnetostrictive sensor, or the like. The strain sensor includes a strain gauge. In a case where the torque sensor 60 includes a strain sensor, the strain sensor is preferably provided on the outer circumferential portion of the rotary body included in the power transmission path.

The crank rotation sensor 62 is used to detect the rotational speed N of the crank 12 of the human-powered vehicle 10. The crank rotation sensor 62 can be any suitable crank rotation sensor that can produce a signal that is indicative of a rotational speed N of the crank 12 of the human-powered vehicle 10. The crank rotation sensor 62 is connected to the controller 52 of the control device 50 so that communication can be performed through wired connection or wireless connection. The crank rotation sensor 62 can be any suitable crank rotation sensor. The crank rotation sensor 62 is attached to, for example, the housing in which the frame 16 or the motor 32 of the human-powered vehicle 10 is provided. The crank rotation sensor 62 is configured to include a magnetic sensor that outputs a signal that is in accordance with the intensity of the magnetic field. An annular magnet, of which magnetic field has an intensity that changes in the circumferential direction, is provided on the crankshaft 12A or the power transmission path between the crankshaft 12A and the first rotary body 22. The crank rotation sensor 62 outputs a signal that is in accordance with the rotational speed N of the crank 12 to the controller 52. The crank rotation sensor 62 can be provided on a member that rotates integrally with the crankshaft 12A in the power transmission path of the human driving force H extending from the crankshaft 12A to the first rotary body 22. For example, the crank rotation sensor 62 can be provided on the first rotary body 22 in a case where the one-way clutch is not provided between the crankshaft 12A and the first rotary body 22. The crank rotation sensor 62 can be used to detect a vehicle speed V of the human-powered vehicle 10. In this case, the controller 52 calculates the rotational speed of the drive wheel 14 in accordance with the rotational speed N of the crank 12 detected by the crank rotation sensor 62 and the transmission ratio B of the human-powered vehicle 10 to determine the vehicle speed V of the human-powered vehicle 10. The information related to the transmission ratio B of the human-powered vehicle 10 is stored in advance in the storage 54.

In a case where the transmission 34 is provided on the human-powered vehicle 10, the controller 52 can calculate the transmission ratio B in accordance with the vehicle speed V of the human-powered vehicle 10 and the rotational speed N of the crank 12. In this case, information related to the circumferential length of the drive wheel 14, the diameter of the drive wheel 14, or the radius of the drive wheel 14 is stored in advance in the storage 54. In a case where the first sensor 56 detects the rotational speed of the drive wheel 14 and the human-powered vehicle 10 includes the transmission 34, the first sensor 56 preferably includes a shift sensor for detecting the transmission ratio B. The shift sensor detects the current shift stage of the transmission 34. The relationship between the shift stage and the transmission ratio B is stored in advance in the storage 54. Thus, the controller 52 can detect the current transmission ratio B from the detection result of the shift sensor. The controller 52 can calculate the rotational speed N of the crank 12 by dividing the rotational speed of the drive wheel 14 by the transmission ratio B. In this case, the vehicle speed sensor 68 can be used as the crank rotation sensor 62.

The second sensor 58 includes at least one of a wind sensor 64, an acceleration sensor 66, a vehicle speed sensor 68, and an inclination sensor 70. The second sensor 58 can further include a torque sensor 72, a crank rotation sensor 74, an image sensor 76, and a load sensor 78. The second sensor 58 differs from the first sensor 56. In a case where at least one of the first sensor 56 and the second sensor 58 includes a plurality of sensors and at least one of the sensors included in the first sensor 56 is not included in the second sensor 58, the second sensor 58 differs from the first sensor 56.

The wind sensor 64 is used to detect at least one of a wind speed and a wind pressure. The wind sensor 64 includes at least one of a wind speed sensor and a wind pressure sensor. The wind sensor 64 can any wind sensor that can produce a signal that is indicative at least one of a wind speed and a wind pressure. The wind sensor 64 is provided, for example, on the handlebar 16C of the human-powered vehicle 10. The wind sensor 64 is preferably configured to be able to detect at least one of the headwind and the tailwind in a case where the human-powered vehicle 10 travels forward.

The acceleration sensor 66 is used to detect an acceleration a in the direction in which the human-powered vehicle 10 moves forward. The acceleration sensor 66 includes an acceleration sensor. The acceleration sensor 74 can be any suitable acceleration sensor that can produce a signal that is indicative of a forward acceleration of the human-powered vehicle 10. The acceleration sensor 66 outputs a signal that is in accordance with the acceleration a in the direction in which the human-powered vehicle 10 moves forward to the controller 52.

The vehicle speed sensor 68 is used to detect the vehicle speed V of the human-powered vehicle 10. In one example, the vehicle speed sensor 68 includes a vehicle speed sensor. The vehicle speed sensor 68 detects the rotational speed of the wheel. The vehicle speed sensor 68 can be any suitable vehicle speed sensor that can produce a signal that is indicative of the rotational speed of a wheel. The vehicle speed sensor 68 is electrically connected to the controller 52 in a wired or wireless manner. The vehicle speed sensor 68 is connected to the controller 52 so that communication can be performed through wired connection or wireless connection. The vehicle speed sensor 68 outputs a signal that is in accordance with the rotational speed of the wheel to the controller 52. The controller 52 calculates a vehicle speed V of the human-powered vehicle 10 based on the rotational speed of the wheel. The controller 52 stops the motor 32 in a case where the vehicle speed V becomes higher than or equal to a predetermined value. The predetermined value is, for example, 25 kilometers per hour or 45 kilometers per hour. The vehicle speed sensor 68 preferably includes a magnetic reed forming a reed switch or a Hall element. The vehicle speed sensor 68 can be mounted on a chain stay of the frame 16 to detect a magnet attached to the drive (rear) wheel 14 or can be provided on the front fork 16A to detect a magnet attached to the front wheel. Thus, in the case of a reed switch or a Hall element, the vehicle speed sensor 68 indirectly detects the rotational speed of the wheel by detecting a magnet attached to the wheel. In another example, sensor 68 includes a GPS receiver. The controller 52 can detect the vehicle speed V of the human-powered vehicle 10 in accordance with the GPS information obtained by the GPS receiver, map information recorded in advance in the storage 54, and the time. The controller 52 preferably includes a timing circuit configured to measure time. Alternatively, the vehicle speed sensor 68 can directly detect the rotational speed of the wheel by using a speedometer gear assembly that is directly rotated by the wheel.

The inclination sensor 70 is used to detect the tilt of the human-powered vehicle 10. An inclination angle D of the road surface on which the human-powered vehicle 10 travels can be detected by the inclination sensor 70. The inclination angle D of the road surface on which the human-powered vehicle 10 travels can be detected by the inclination angle in an advancing direction of the human-powered vehicle 10. The inclination angle D of the road surface on which the human-powered vehicle 10 travels corresponds to the inclination angle of the human-powered vehicle 10. In one example, the inclination sensor 70 can be any suitable inclination sensor that can produce a signal that is indicative an inclination of the human-powered vehicle 10. An example of the inclination sensor 70 is a gyro sensor or an acceleration sensor. In another example, the inclination sensor 70 includes a global positioning system (GPS) receiver. The controller 52 can calculate the inclination angle D of the road surface on which the human-powered vehicle 10 travels in accordance with the GPS information obtained by the GPS receiver and the road surface gradient included in the map information recorded in advance in the storage 54.

The torque sensor 72 is used to detect the human driving force H. The torque sensor 72 has the same configuration as the torque sensor 60. The torque sensor 72 and the torque sensor 60 can be used in common. The torque sensor 72 is configured in the same manner as the torque sensor 60. Although the torque sensor 60 can be used as the torque sensor 72, the torque sensor 72 can be configured separately from the torque sensor 60. In the case of detecting the power WH of the human driving force H using the torque sensor 72, the torque sensor 72 has the same configuration as the torque sensor 60 and the crank rotation sensor 62. The torque sensor 72 is configured in the same manner as the torque sensor 60 and the crank rotation sensor 62. The torque sensor 60 and the crank rotation sensor 62 can be used as the torque sensor 72. However, the torque sensor 72 can be configured separately from the torque sensor 60 and the crank rotation sensor 62.

The crank rotation sensor 74 is used to detect the rotational speed N of the crank 12 of the human-powered vehicle 10. The torque sensor 74 is configured in the same manner as the crank rotation sensor 62. Although the crank rotation sensor 62 can be used as the crank rotation sensor 74, the crank rotation sensor 74 can be configured separately from the wind sensor 64.

The image sensor 76 is used to detect a front projection area A of at least one of the human-powered vehicle 10 and the rider. The image sensor 76 includes any suitable image sensor that can produce a signal that is indicative of a front projection area A of at least one of the human-powered vehicle 10 and the rider. For example, the image sensor 76 is provided on the handlebar 16C of the human-powered vehicle 10 to capture an image of a rider of the human-powered vehicle 10. The image sensor 76 outputs image data of at least one of the human-powered vehicle 10 and the rider to the controller 52. The controller 52 calculates the front projection area A of at least one of the human-powered vehicle 10 and the rider in accordance with the image data input from the image sensor 76.

The load sensor 78 is used to detect a value related to the weight of the product of the human-powered vehicle 10. The load sensor 78 detects the weight of the product of the human-powered vehicle 10. The load sensor 78 can be any suitable load sensor that can produce a signal that is indicative of the weight of the carried load of the human-powered vehicle 10. The load sensor 78 is provided, for example, on an axle of at least one of the front wheel and the rear wheel. In this case, the load sensor 78 is preferably provided on both the front wheel and the rear wheel. The total weight m of the human-powered vehicle 10 and the load can be detected by, for example, associating the signal output from the load sensor 78 in a state the human-powered vehicle 10 is lifted away from the ground to weight 0 (gram weight). Furthermore, the weight of the rider of the human-powered vehicle 10 can be detected by, for example, corresponding the signal output from the load sensor 78 in a state the rider is not on board to weight 0 (gram weight). The relationship between the information output from the load sensor 78 and the weight is preferably stored in the storage 54. The load sensor 78 includes a pressure sensor or a strain sensor. The load sensor 78 can detect, for example, the force applied to the saddle of the human-powered vehicle 10. In this case, the weight of the rider can be detected by the load sensor 78. For example, the load sensor 78 can detect the air pressure of the tire of the human-powered vehicle 10. In this case, the controller 52 calculates the weight of the product using the air pressure of the tire. Instead of the load sensor 78, an input unit capable of inputting information related to the weight of the product to the controller 52 can be provided on the control device 50. In a case where the information related to the weight of the rider is input through the input unit, the controller 52 preferably stores the information related to the weight of the rider in the storage 54. The information related to the weight of the product includes, for example, the weight of the rider. The information related to the weight of the human-powered vehicle 10 is stored in the storage 54. The controller 52 can calculate the total weight m of the human-powered vehicle 10 and the load by adding the weight of the human-powered vehicle 10 and the weight of the product.

The controller 52 controls the human-powered vehicle component 30 included in the human-powered vehicle 10 in accordance with the human driving force H. The controller 52 controls the motor 32 in accordance with the human driving force H. For example, the controller 52 controls the motor 32 so that the assist force generated by the motor 32 to the human driving force H becomes equal to a predetermined ratio. The controller 52 controls the motor 32 in a plurality of control modes having different ratios Y of the output of the motor 32 to the human driving force H. A ratio YA of the power WM (watt) of the output of the motor 32 to the power WH (watt) of the human driving force H of the human-powered vehicle 10 is also referred to as a ratio Y. The power WH of the human driving force H is calculated by multiplying the human driving force H and the rotational speed N of the crank 12. A torque ratio YB of the output torque TM of the motor 32 to the torque TH of the human driving force H of the human-powered vehicle 10 is also referred to as a ratio Y. In a case where the output of the motor 32 is input to the power transmission path of the human driving force H through the speed reducer, the output of the speed reducer corresponds to the output of the motor 32. The controller 52 can control the motor 32 so that the output torque TM of the assist force generated by the motor 32 to the torque TH of the human driving force H of the human-powered vehicle 10 becomes equal to a predetermined ratio.

The controller 52 controls the motor 32 so that the output of the motor 32 becomes smaller than or equal to a predetermined value. The output of the motor 32 includes the power WM of the motor 32. The controller 52 controls the motor 32 so that the ratio YA becomes smaller than or equal to a predetermined value YA1. In one example, the predetermined value YA1 is 500 watts. In another example, the predetermined value YA1 is 300 watts. The controller 52 controls the motor 32 so that the torque ratio YB becomes smaller than or equal to a predetermined torque ratio YB1. In one example, the predetermined torque ratio YB1 is 300%.

The controller 52 controls the human-powered vehicle component 30 in accordance with a first value K1 and a second value K2. The controller 52 controls the motor 32 in accordance with the first value K1 and the second value K2.

The first value K1 relates to the human driving force H obtained using the first sensor 56 or the driving force HP of the human-powered vehicle 10. The second value K2 relates to the human driving force H obtained using the second sensor 58 or the driving force HP of the human-powered vehicle 10. In one example, the first value K1 and the second value K2 are the torque TH of the human driving force H. In another example, the first value K1 and the second value K2 are the power WH of the human driving force H. The power WH of the human driving force H is obtained by multiplying the torque TH of the human driving force H by the rotational speed N of the crank 12. For example, the controller 52 calculates the torque TH of the human driving force H obtained by the first sensor 56 and sets the torque TH as the first value K1. In a case where the motor 32 is driven, the driving force HP of the human-powered vehicle 10 includes the human driving force H and the output of the motor 32. The first value K1 and the second value K2 are values obtained by adding the human driving force H and the output of the motor 32. The first value K1 and the second value K2 can be the torque T of the driving force HP of the human-powered vehicle 10. In this case, the first value K1 and the second value K2 can be a torque obtained by adding the torque TH of the human driving force H and the output torque TM of the motor 32 output in accordance with the human driving force H. The first value K1 and the second value K2 can be the power W of the driving force HP of the human-powered vehicle 10. In this case, the first value K1 and the second value K2 are the power W obtained by adding the power W of the human driving force H and the power WM of the motor 32 output in accordance with the human driving force H. For example, in a case where the output of the motor 32 is included in the driving force HP of the human-powered vehicle 10, the torque sensor 60 can detect the torque T of the human-powered vehicle 10 by providing the torque sensor 60 at the downstream side of where the output of the motor 32 merges with the human driving force H in the power transmission path of the human driving force H. Furthermore, the controller 52 can estimate the output torque TM of the motor 32 based on the control command value for driving the motor 32 or by detecting the current of the motor 32. The motor 32 and the portion to which the first rotary body 22 is attached are connected directly or by a speed reducer, and the speed reduction ratio is fixed. Thus, the controller 52 can estimate the output torque TM of the portion to which the first rotary body 22 is attached based on the output torque TM of the motor 32. The output of the motor 32 need not be added to the first value K1. In such a case, the first value K1 can be an output of the human driving force H, and the second value K2 can be a value obtained by adding the human driving force H and the output of the motor 32. In the case where the output of the motor 32 is not added to the first value K1 and the case where the motor 32 is driven, the first value K1 can be a value obtained by adding the human driving force H and a predetermined value. The predetermined value is preferably stored in advance in the storage 54.

For example, the controller 52 calculates the second value K2 from the travel resistance RY of the human-powered vehicle 10 calculated by the second sensor 58. The travel resistance RY includes at least one of the air resistance R1, the rolling resistance R2 of the wheel of the human-powered vehicle 10, and the gradient resistance R3 of the traveling road of the human-powered vehicle 10. In one example, the travel resistance RY includes every one of the air resistance R1, the rolling resistance R2 of the wheel of the human-powered vehicle 10, and the gradient resistance R3 of the traveling road of the human-powered vehicle 10.

The controller 52 calculates the travel resistance RY based on the output of the second sensor 58 and the information stored in the storage 54. The travel resistance RY is calculated based on the air resistance R1, the rolling resistance R2 of the wheel of the human-powered vehicle 10, the gradient resistance R3 of the traveling road of the human-powered vehicle 10, and the acceleration resistance R4 of the human-powered vehicle 10. In this case, the travel resistance RY is obtained, for example, from equation (1). The air resistance R1 is obtained from equation (2). The rolling resistance R2 of the wheel of the human-powered vehicle 10 is obtained from equation (3). The gradient resistance R3 of the traveling road of the human-powered vehicle 10 is obtained from equation (4). The acceleration resistance R4 of the human-powered vehicle 10 is obtained from equation (5).

$$RY = R1 + R2 + R3 + R4 \tag{1}$$

$$R1 = C \times A \times (V - Va)^2 \tag{2}$$

$$R2 = M \times m \times g \tag{3}$$

$$R3 = m \times g \times \sin D \tag{4}$$

$$R4 = m \times a \tag{5}$$

Symbol "C" indicates the air resistance coefficient of at least one of the human-powered vehicle 10 and the rider. For the air resistance coefficient C, an appropriate fixed value can be stored in the storage 54 in advance or it can be input by a rider through an operation unit or the like.

Symbol "A" indicates the front projection area. The front projection area A can be detected using the image sensor 76, an appropriate fixed value can be stored in advance in the storage 54, or it can be input by a rider through an operation unit or the like.

Symbol "Va" indicates the wind speed detected by the wind sensor 64. The wind speed Va takes a negative value in a case where the wind is a headwind with respect to the human-powered vehicle 10. In the case where the detection unit is installed toward the direction of moving forward so that the wind sensor 64 detects the headwind in the direction in which the human-powered vehicle 10 moves forward, the wind sensor 64 outputs a signal that is in accordance with V-Va. The wind speed Va can be detected by the wind sensor 64, an appropriate fixed value can be stored in advance in the storage 54, or it can be input by a rider through an operation unit or the like.

Symbol "M" indicates the rolling resistance coefficient of the tire of the human-powered vehicle 10. The rolling resistance coefficient M can be stored in the storage 54 in advance or can be input by the rider through the operation unit or the like. The rolling resistance coefficient M can be changed in accordance with the air pressure of the tire.

Symbol "m" indicates the total weight of the human-powered vehicle 10 and the load. The total weight m can be detected using the load sensor 78, an appropriate fixed value can be stored in the storage 54 in advance, or it can be input by a rider through the operation unit or the like.

Symbol "g" indicates the gravitational acceleration of the human-powered vehicle 10. Symbol "D" indicates the inclination angle of the road surface on which the human-powered vehicle 10 travels. The inclination angle D can be detected by the inclination sensor 70. An appropriate fixed value can be stored in advance in the storage 54 or be input by a rider through the operation unit or the like.

The output of the human-powered vehicle 10 corresponds to the travel resistance RY. Therefore, the travel resistance RY can satisfy equation (6).

$$RY = (T \times iH \times eH) \div r \qquad (6)$$

Symbol "T" indicates the output torque of the human-powered vehicle 10. The torque T of the human-powered vehicle 10 is the output torque of the drive unit. In the present embodiment, the torque T is the torque near the crankshaft 12A at the portion where the first rotary body 22 is attached. The drive unit is provided in the vicinity of the crankshaft 12A, and the output of the motor 32 merges with the human driving force H in the power transmission path of the human driving force H at the upstream side of the first rotary body 22. The torque T of the human-powered vehicle 10 is obtained by adding the torque TH of the human driving force H input to the human-powered vehicle 10 and the output torque TM generated by the motor 32 input to the portion where the first rotary body 22 is attached. In this case, the torque T of the human-powered vehicle 10 can be detected by the torque sensor 60 by providing the torque sensor 60 at the downstream side of where the output of the motor 32 merges with the human driving force H in the power transmission path of the human driving force H. Furthermore, in equation (6), the torque TH of the human driving force H that is not added to the output of the motor 32 can be used as the torque T of the human-powered vehicle 10.

Symbol "iH" is a ratio of the rotational speed N of the crank 12 to the rotational speed of the drive wheel 14. The ratio iH is a reciprocal of the transmission ratio B. In the case where the transmission 34 for changing the transmission ratio B is provided on the human-powered vehicle 10, the controller 52 can calculate the ratio iH in accordance with the vehicle speed V of the human-powered vehicle 10 and the rotational speed N of the crank 12. In this case, information related to the circumferential length of the drive wheel 14, the diameter of the drive wheel 14, or the radius of the drive wheel 14 is stored in advance in the storage 54. The transmission 34 includes at least one of a derailleur and an internal transmission device. The derailleur includes at least one of a front derailleur and a rear derailleur. The controller 52 can calculate the rotational speed of the drive wheel 14 from the vehicle speed V using the circumferential length of the drive wheel 14, the diameter of the drive wheel 14, or the radius of the drive wheel 14. The controller 52 can calculate the ratio iH by dividing the rotational speed N of the crank 12 by the rotational speed of the drive wheel 14. In a case where the wind sensor 64 detects the rotational speed of the drive wheels 14 and the human-powered vehicle 10 includes the transmission 34, the wind sensor 64 preferably includes a shift sensor for detecting the transmission ratio B. The shift sensor detects the current shift stage of the transmission 34. The relationship between the shift stage and the transmission ratio B is stored in advance in the storage 54. The controller 52 can thereby detect the current transmission ratio B from the detection result of the shift sensor. The controller 52 can calculate the ratio iH by obtaining a reciprocal of the transmission ratio B.

Symbol "V" indicates the vehicle speed of the human-powered vehicle 10. Symbol "r" indicates the radius of the wheel. Information related to the radius of the wheel is stored in advance in the storage 54.

In a case where the motor 32 is provided on the front wheel, the controller 52 can obtain the travel resistance R by adding the travel resistance RH related to the human driving force H and the travel resistance RM related to the output of the motor 32. In this case, the travel resistance RH related to the human driving force H can be obtained in the same manner as with equation (6). The travel resistance RM related to the output of the motor 32 is obtained by replacing the portion of "T" in the above equation (6) with the output torque TM of the motor 32, replacing "eH" with the power transmission efficiency to the front wheel of the motor 32, and replacing "iH" with "1" if the motor 32 directly rotates the front wheels.

The controller 52 calculates the torque T of the human-powered vehicle 10 that is in accordance with the detection result of the first sensor 56 as the first value K1. The controller 52 calculates the torque T of the human-powered vehicle 10, which is obtained by using the travel resistance RY calculated from equation (1) and equation (6), as the second value K2.

The controller 52 preferably controls the human-powered vehicle component 30 in accordance with the average value of the first value K1 and the second value K2. The controller 52 preferably controls at least one of the motor 32, the actuator 42, the actuator 44, and the actuator 46 in accordance with the average value of the first value K1 and the second value K2. The controller 52 can preferably control only one of the motor 32, the actuator 42, the actuator 44, and the actuator 46 in accordance with the average value of the first value K1 and the second value K2.

The controller 52 controls at least one of the motor 32, the actuator 42, the actuator 44, and the actuator 46 in accordance with, for example, the average value of the first value K1 and the second value K2. The controller 52 can, for example, control the motor 32 so as to generate an assist force of a predetermined ratio Y with respect to the average value of the first value K1 and the second value K2. For example, the controller 52 can calculate the power WH of the human driving force H by multiplying the average value of the first value K1 and the second value K2 by the rotational speed N of the crank 12 to control the motor 32 so that the power WM of the motor 32 to the power WH of the human driving force H becomes a predetermined ratio YA.

For example, the controller 52 can control the actuator 42 of the transmission 34 so that the transmission ratio B becomes smaller if the average value of the first value K1 and the second value K2 becomes greater than or equal to the predetermined first value K1 and control the actuator 42 of the transmission 34 so that the transmission ratio B becomes larger if the average value becomes smaller than or equal to the predetermined second value K2, which is smaller than the predetermined first value K1. Information related to the predetermined first value K1 and predetermined second value K2 is stored in the storage 54.

For example, the controller 52 can control the actuator 44 so that the suspension 36 becomes a first state if the average value of the first value K1 and the second value K2 becomes greater than or equal to a predetermined third value K3 and control the actuator 44 so that the suspension 36 becomes a second state, which differs from the first state, if the average value becomes smaller than the predetermined third value K3 or smaller than or equal to a predetermined fourth value K4, which is smaller than the predetermined third value K3. For example, in the second state, the suspension 36 can be harder or softer than that in the first state. For example, in the second state, the damping rate of the suspension 36 can be smaller or larger than that in the first state. For example, in the second state, the height of the suspension 36 can be lower or higher than in the first state. The information related to the setting of the suspension 36 in the first state and the second state is stored in the storage 54. The information related to the setting of the suspension 36 in the first state and the second state can be changed, for example, by the user operating the operation unit.

For example, the controller 52 can control the actuator 44 so that the adjustable seatpost 38 becomes a third state if the average value of the first value K1 and the second value K2 becomes greater than or equal to a predetermined fifth value K5 and control the actuator 44 so that the adjustable seatpost 38 becomes a fourth state, which differs from the third state, if the average value becomes smaller than the predetermined fifth value K5 or smaller than or equal to a predetermined sixth value K6 smaller than the predetermined fifth value K5. For example, in the second state, the height of the adjustable seatpost 38 can be lower or higher than in the first state. Information regarding the setting of the adjustable seatpost 38 in the third state and the fourth state is stored in the storage 54.

In a case where a difference dK of the first value K1 and the second value K2 is not within a predetermined range rK, the controller 52 preferably controls the human-powered vehicle component 30 in accordance with the smaller one of the first value K1 and the second value K2. In a case where the difference dK of the first value K1 and the second value K2 is not within the predetermined range rK, the controller 52 preferably controls at least one of the motor 32, the actuator 42, the actuator 44, and the actuator 46 in accordance with the smaller one of the first value K1 and the second value K2. In a case where the difference dK of the first value K1 and the second value K2 is not within the predetermined range rK, the controller 52 preferably controls only one of the motor 32, the actuator 42, the actuator 44, and the actuator 46 in accordance with the smaller value of the first value K1 and the second value K2. The control of the controller 52 performed in accordance with the smaller value of the first value K1 and the second value K2 is similar to the process in which the average value of the first value K1 and the second value K2 is replaced with the smaller one of the first value K1 and the second value K2 in the control of the controller 52 performed in accordance with the average value of the first value K1 and the second value K2 and thereby will not be described. The predetermined range rK is set with a value for determining a state in which abnormality is occurring in at least one of the first sensor 56 and the second sensor 58. The predetermined range rK is stored in advance in the storage 54.

A process for controlling the human-powered vehicle component 30 will now be described with reference to FIG. 3. In a case where power is supplied from the battery 28 to the controller 52, the controller 52 starts the process and proceeds to step S11 of the flowchart shown in FIG. 4. As long as power is supplied, the controller 52 performs the process from step S11 in predetermined cycles.

In step S11, the controller 52 obtains the first value K1 and proceeds to step S12. In step S12, the controller 52 obtains the second value K2 and proceeds to step S13. The order of step S11 and step S12 can be reversed. In step S13, the controller 52 determines whether or not the difference dK of the first value K1 and the second value K2 falls within the predetermined range rK. In a case where the difference dK of the first value K1 and the second value K2 is determined as falling within the predetermined range rK, the controller 52 proceeds to step S14. In step S14, the controller 52 controls the human-powered vehicle component 30 in accordance with the average value of the first value K1 and the second value K2. For example, the controller 52 controls at least one of the motor 32, the actuator 42, the actuator 44, and the actuator 46 in accordance with the average value of the first value K1 and the second value K2 and then terminates the process.

In a case where the difference dK of the first value K1 and the second value K2 is determined as not falling within the predetermined range rK in step S13, the controller 52 proceeds to step S15. In step S15, the controller 52 determines whether or not the first value K1 is smaller than the second value K2. In a case where the first value K1 is determined to be smaller than the second value K2 in step S15, the controller 52 proceeds to step S16. In step S16, the controller 52 controls the human-powered vehicle component 30 in accordance with the first value K1. For example, the controller 52 controls at least one of the motor 32, the actuator 42, the actuator 44, and the actuator 46 in accordance with the first value K1 and then terminates the process.

In a case where the first value K1 is determined as not being smaller than the second value K2 in step S15, the controller 52 proceeds to step S17. In step S17, the controller 52 controls the human-powered vehicle component 30 in accordance with the second value K2. For example, the controller 52 controls at least one of the motor 32, the actuator 42, the actuator 44, and the actuator 46 in accordance with the second value K2 and then terminates the process.

Second Embodiment

The control device 50 of a second embodiment will now be described with reference to FIGS. 2 and 4. The control device 50 of the second embodiment is similar to the control device 50 of the first embodiment except in that the control device 50 controls the human-powered vehicle component 30 in accordance with the travel resistances RX and RY. Same reference numerals are given to those components that are the same as the corresponding components of the first embodiment. Such components will not be described in detail.

The controller 52 controls the human-powered vehicle component 30 included in the human-powered vehicle 10 in accordance with the travel resistances RX and RY. The controller 52 controls the motor 32 in accordance with the travel resistances RX and RY. The controller 52 controls the motor 32 in a plurality of control modes having different ratios Y of the output of the motor 32 to the human driving force H. For example, in a case where the travel resistances RX and RY are changed in at least one of the plurality of control modes, the controller 52 changes the ratio YA of the power WM of the motor 32 to the power WH of the human driving force H and controls the motor 32 so that the change amount of a change in the travel resistances RX and RY differs from the change amount of the power WH of the motor 32. For example, in a case where the travel resistances RX and RY are changed in at least one of the plurality of control modes, the controller 52 can control the motor 32 so that the change in the power WM of the motor 32 becomes larger than the change in the power WH of the human driving force H. For example, in a case where the travel resistances RX and RY are changed in at least one of the plurality of control modes, the controller 52 can control the motor 32 to change the power WM of the motor 32 without changing the power WH of the human driving force H.

The controller 52 controls the human-powered vehicle component 30 in accordance with the first value L1 and the second value L2. The controller 52 controls at least one of the motor 32, the actuator 42, the actuator 44, and the actuator 46 in accordance with the first value L1 and the second value L2.

The first value L1 relates to the travel resistance RX obtained using the first sensor 56. The second value L2 relates to the travel resistance RY obtained using the second sensor 58. The controller 52 sets the travel resistance RY calculated from equation (1) illustrated in the first embodiment as the second value L2.

The output of the human-powered vehicle 10 corresponds to the travel resistance RY. Therefore, in one example, the travel resistance RX is calculated based on the torque TH of the human driving force H, the rotational speed N of the crank 12, and the vehicle speed V. In this case, the travel resistance RX is obtained, for example, from equation (7). The controller 52 sets the travel resistance RX calculated from equation (7) as the first value L1.

$$RX=(2P/60)\times(T\times N\times eH)\div V \quad (7)$$

Symbol "P" indicates the circumference ratio. Symbol "N" indicates the rotational speed of the crank 12 of the human-powered vehicle 10. Symbol "V" indicates the vehicle speed V of the human-powered vehicle 10.

The controller 52 controls the human-powered vehicle component 30 in accordance with the average value of the first value L1 and the second value L2. The controller 52 controls at least one of the motor 32, the actuator 42, the actuator 44, and the actuator 46 in accordance with the average value of the first value L1 and the second value L2. The controller 52 can control only one of the motor 32, the actuator 42, the actuator 44, and the actuator 46 in accordance with the average value of the first value L1 and the second value L2. The control of the controller 52 performed in accordance with the smaller one of the first value L1 and the second value L2 is similar to the process in which the average value of the first value K1 and the second value K2 in the control of the controller 52 performed in accordance with the average value of the first value K1 and the second value K2 of the first embodiment is replaced with the average value of the first value L1 and the second value L2 and thereby will not be described.

In a case where a difference dL of the first value L1 and the second value L2 is not within a predetermined range rL, the controller 52 controls the human-powered vehicle component 30 in accordance with the smaller one of the first value L1 and the second value L2. In a case where the difference dL of the first value L1 and the second value L2 is not within the predetermined range rL, the controller 52 controls at least one of the motor 32, the actuator 42, the actuator 44, and the actuator 46 in accordance with the smaller one of the first value L1 and the second value L2. In a case where the difference dL of the first value L1 and the second value L2 is not within the predetermined range rL, the controller 52 controls only one of the motor 32, the actuator 42, the actuator 44, and the actuator 46 in accordance with the smaller one of the first value L1 and the second value L2. The predetermined range rL is set with a value for determining a state in which abnormality is occurring in at least one of the first sensor 56 and the second sensor 58. The predetermined range rL is stored in advance in the storage 54. The control of the controller 52 performed in accordance with the smaller value of the first value L1 and the second value L2 is similar to the process in which the average value of the first value K1 and the second value K2 in the control of the controller 52 performed in accordance with the average value of the first value K1 and the second value K2 of the first embodiment is replaced with the smaller value of the first value L1 and the second value L2 and thereby will not be described.

The process for controlling the human-powered vehicle component 30 will now be described with reference to FIG. 4. In a case where power is supplied from the battery 28 to the controller 52, the controller 52 starts the process and proceeds to step S21 of the flowchart shown in FIG. 4. As long as power is supplied, the controller 52 performs the process from step S21 in predetermined cycles.

In step S21, the controller 52 obtains the first value L1 and proceeds to step S22. In step S22, the controller 52 obtains the second value L2 and proceeds to step S23. The order of step S21 and step S22 can be reversed. In step S23, the controller 52 determines whether or not the difference dL of the first value L1 and the second value L2 falls within the predetermined range rL. In a case where the difference dL of the first value L1 and the second value L2 is determined as falling within the predetermined range rL, the controller 52 proceeds to step S24. In step S24, the controller 52 controls the human-powered vehicle component 30 in accordance with the average value of the first value L1 and the second value L2. For example, the controller 52 controls at least one of the motor 32, the actuator 42, the actuator 44, and the actuator 46 in accordance with the average value of the first value L1 and the second value L2 and then terminates the process.

In a case where the difference dL of the first value L1 and the second value L2 is determined as not falling within the predetermined range rL in step S23, the controller 52 proceeds to step S25. In step S25, the controller 52 determines whether or not the first value L1 is smaller than the second value L2. In a case where the first value L1 is determined to be smaller than the second value L2 in step S25, the controller 52 proceeds to step S26. In step S26, the controller 52 controls the human-powered vehicle component 30 in accordance with the first value L1. For example, the controller 52 controls at least one of the motor 32, the actuator 42, the actuator 44, and the actuator 46 in accordance with the first value L1 and then terminates the process.

In a case where the first value L1 is determined as not being smaller than the second value L2 in step S25, the controller 52 proceeds to step S27. In step S27, the controller 52 controls the human-powered vehicle component 30 in accordance with the second value L2. For example, the controller 52 controls at least one of the motor 32, the actuator 42, the actuator 44, and the actuator 46 in accordance with the second value KL and then terminates the process.

Third Embodiment

The control device 50 of a third embodiment will now be described with reference to FIGS. 2 and 5. The control device 50 of the third embodiment is similar to the control device 50 of the first embodiment except in that the control of the human-powered vehicle component 30 is changed in accordance with the first value K1 and the second value K2. Same reference numerals are given to those components that are the same as the corresponding components of the first embodiment. Such components will not be described in detail.

In a case where the difference dK of the first value K1 and the second value K2 does not fall within the predetermined range rK, the controller 52 does not operate the human-powered vehicle component 30 in accordance with the first value K1 and the second value K2. In a case where the difference dK of the first value K1 and the second value K2 does not fall within the predetermined range rK, the controller 52 does not operate at least one of the motor 32, the actuator 42, the actuator 44, and the actuator 46 in accordance with the first value K1 and the second value K2. Specifically, in a case where the difference dK of the first value K1 and the second value K2 does not fall within the predetermined range rK, the controller 52 restricts the operation of at least one of the motor 32, the actuator 42, the actuator 44, and the actuator 46 that is in accordance with the first value K1 and the second value K2. In a case where the difference dK of the first value K1 and the second value K2 does not fall within the predetermined range rK, the controller 52 does not operate any of the motor 32, the actuator 42, the actuator 44, and the actuator 46 in accordance with the first value K1 and the second value K2. In a case where the difference dK of the first value K1 and the second value K2 does not fall within the predetermined range rK, the controller 52 can stop at least one of the motor 32, the actuator 42, the actuator 44, and the actuator 46. In a case where the difference dK of the first value K1 and the second value K2 does not fall within the predetermined range rK, the controller 52 can operate at least one of the motor 32, the actuator 42, the actuator 44, and the actuator 46 in accordance with parameters other than the first value K1 and the second value K2 or conditions.

The process for controlling the human-powered vehicle component 30 will now be described with reference to FIG. 5. In a case where power is supplied from the battery 28 to the controller 52, the controller 52 starts the process and proceeds to step S31 of the flowchart shown in FIG. 5. As long as power is supplied, the controller 52 performs the process from step S31 in predetermined cycles.

In step S31, the controller 52 obtains the first value K1 and proceeds to step S32. In step S32, the controller 52 obtains the second value K2 and proceeds to step S33. The order of step S31 and step S32 can be reversed. In step S33, the controller 52 determines whether or not the difference dK of the first value K1 and the second value K2 falls within the predetermined range rK. In a case where the difference dK of the first value K1 and the second value K2 is determined as falling within the predetermined range rK, the controller 52 proceeds to step S34. In step S34, the controller 52 permits the operation of the human-powered vehicle component 30 that is in accordance with the first value K1 and the second value K2. For example, the controller 52 permits the operation of the human-powered vehicle component 30 that is in accordance with the first value K1 and the second value K2 by canceling a restriction flag of the operation of the human-powered vehicle component 30 and then terminates the process. In a case where the restriction flag of the operation of the human-powered vehicle component 30 is not set, the controller 52 operates the human-powered vehicle component 30 in accordance with the first value K1 and the second value K2. For example, the controller 52 controls at least one of the motor 32, the actuator 42, the actuator 44, and the actuator 46 in accordance with at least one of the first value K1, the second value K2, and the average value of the first value K1 and the second value K2.

In a case where the difference dK of the first value K1 and the second value K2 is determined as not falling within the predetermined range rK in step S33, the controller 52 proceeds to step S35. In step S35, the controller 52 restricts the operation of the human-powered vehicle component 30 that is in accordance with the first value K1 and the second value K2. For example, the controller 52 restricts the operation of the human-powered vehicle component 30 that is in accordance with the first value K1 and the second value K2 by setting the restriction flag of the operation of the human-powered vehicle component 30. In a case where the restriction flag of the operation of the human-powered vehicle component 30 is set, the controller 52 does not operate the human-powered vehicle component 30 in accordance with the first value K1 and the second value K2.

Fourth Embodiment

The control device 50 of a fourth embodiment will now be described with reference to FIGS. 2 and 6. The control device 50 of the fourth embodiment is similar to the control device 50 of the second embodiment except in that the control of the human-powered vehicle component 30 is changed in accordance with the first value L1 and the second value L2. Thus, same reference numerals are given to those components that are the same as the corresponding components of the first embodiment. Such components will not be described in detail.

In a case where the difference dK of the first value L1 and the second value L2 does not fall within the predetermined range rK, the controller 52 does not operate the human-powered vehicle component 30 in accordance with the first value L1 and the second value L2. In a case where the difference dK of the first value L1 and the second value L2 does not fall within the predetermined range rK, the controller 52 does not operate the motor 32 in accordance with the first value L1 and the second value L2. Specifically, in a case where the difference dK of the first value L1 and the second value L2 does not fall within the predetermined range rK, the controller 52 restricts the operation of the motor 32 that is in accordance with the first value L1 and the second value L2. In a case where the difference dK of the first value L1 and the second value L2 does not fall within the predetermined range rK, the controller 52 can stop the motor 32. In a case where the difference dL of the first value L1 and the second value L2 does not fall within the predetermined range rL, the controller 52 can operate at least one of the motor 32, the actuator 42, the actuator 44, and the actuator 46 in accordance with parameters or conditions other than the first value L1 and the second value L2.

The process for controlling the human-powered vehicle component 30 will now be described with reference to FIG. 6. In a case where power is supplied from the battery 28 to the controller 52, the controller 52 starts the process and proceeds to step S41 of the flowchart shown in FIG. 6. As long as power is supplied, the controller 52 performs the process from step S41 in predetermined cycles.

In step S41, the controller 52 obtains the first value L1 and proceeds to step S42. In step S42, the controller 52 obtains the second value L2 and proceeds to step S43. The order of step S41 and step S42 can be reversed. In step S43, the controller 52 determines whether or not the difference dL of the first value L1 and the second value L2 falls within the predetermined range rL. In a case where the difference dL of the first value L1 and the second value L2 is determined as falling within the predetermined range rL, the controller 52 proceeds to step S44. In step S44, the controller 52 permits the operation of the human-powered vehicle component 30 that is in accordance with the first value L1 and the second value L2. For example, the controller 52 permits the operation of the human-powered vehicle component 30 that is in accordance with the first value L1 and the second value L2 by canceling a restriction flag of the operation of the human-powered vehicle component 30 and then terminates the process. In a case where the restriction flag of the operation of the human-powered vehicle component 30 is not set, the controller 52 operates the human-powered vehicle component 30 in accordance with the first value L1 and the second value L2. For example, the controller 52 controls at least one of the motor 32, the actuator 42, the actuator 44, and the actuator 46 in accordance with at least one of the first value L1, the second value L2, and the average value of the first value L1 and the second value L2.

In a case where the difference dL of the first value L1 and the second value L2 is determined as not falling within the predetermined range rL in step S43, the controller 52 proceeds to step S45. In step S45, the controller 52 restricts the operation of the human-powered vehicle component 30 that is in accordance with the first value L1 and the second value L2. For example, the controller 52 restricts the operation of the human-powered vehicle component 30 that is in accordance with the first value L1 and the second value L2 by setting the restriction flag of the operation of the human-powered vehicle component 30. In a case where the restriction flag of the operation of the human-powered vehicle component 30 is set, the controller 52 does not operate the human-powered vehicle component 30 in accordance with the first value L1 and the second value L2.

Fifth Embodiment

Figure 7:
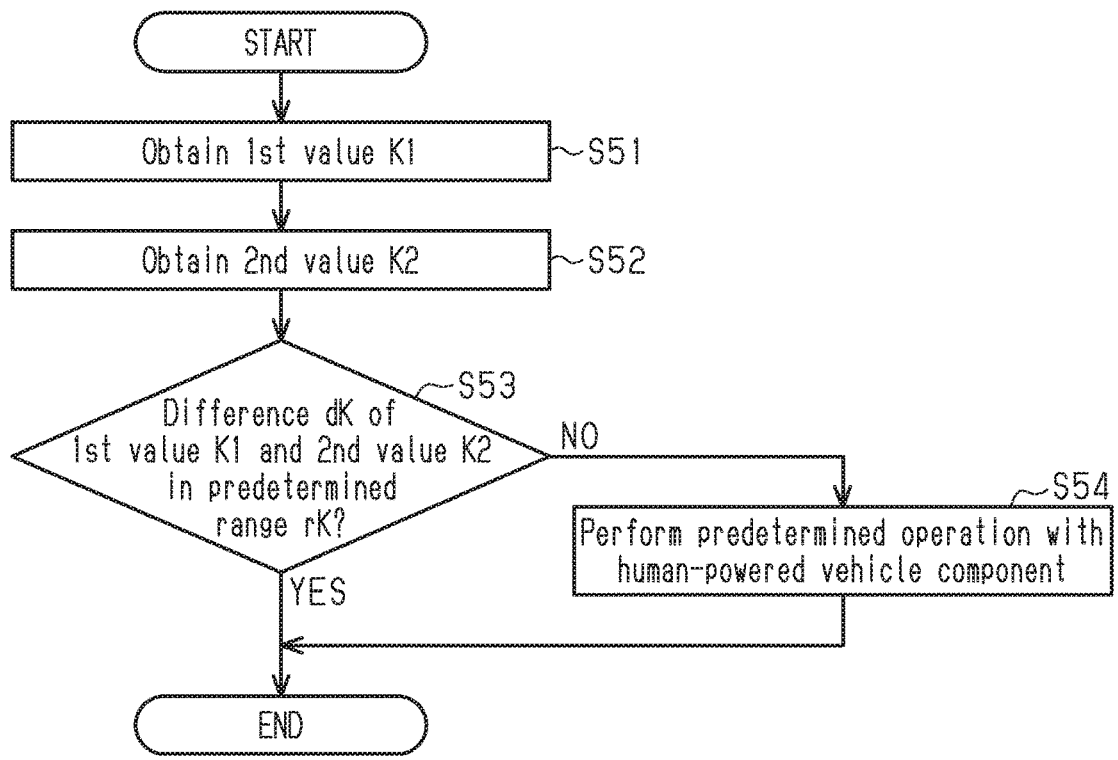
FIG. 7 is a flowchart of a process for controlling a human-powered vehicle component executed by an electronic controller in accordance with a fifth embodiment.

The control device 50 of a fifth embodiment will now be described with reference to FIGS. 2 and 7. The control device 50 of the fifth embodiment is similar to the control device 50 of the first embodiment except in that the human-powered vehicle component 30 performs a predetermined operation in a case where the difference dK of the first value K1 and the second value K2 does not fall within the predetermined range rK. Thus, same reference numerals are given to those components that are the same as the corresponding components of the first embodiment. Such components will not be described in detail.

In a case where the difference dK of the first value K1 and the second value K2 does not fall within the predetermined range rK, the controller 52 performs the predetermined operation with the human-powered vehicle component 30. In a case where the difference dK of the first value K1 and the second value K2 does not fall within the predetermined range rK, the controller 52 performs the predetermined operation with at least one of the motor 32, the actuator 42, the actuator 44, and the actuator 46. In one example, the predetermined operation includes stopping the motor 32, stopping the actuator 42, stopping the actuator 44, and stopping the actuator 46.

The process for controlling the human-powered vehicle component 30 will now be described with reference to FIG. 7. In a case where power is supplied from the battery 28 to the controller 52, the controller 52 starts the process and proceeds to step S51 of the flowchart shown in FIG. 7. As long as power is supplied, the controller 52 performs process from step S51 in predetermined cycles.

In step S51, the controller 52 obtains the first value K1 and proceeds to step S52. In step S52, the controller 52 obtains the second value K2 and proceeds to step S53. The order of step S51 and step S52 can be reversed. In step S53, the controller 52 determines whether or not the difference dK of the first value K1 and the second value K2 falls within the predetermined range rK. In a case where the difference dK of the first value K1 and the second value K2 is determined as falling within the predetermined range rK, the controller 52 terminates the process. In this case, the controller 52 operates the human-powered vehicle component 30 in accordance with the first value K1 and the second value K2. For example, the controller 52 controls at least one of the motor 32, the actuator 42, the actuator 44, and the actuator 46 in accordance with at least one of the first value K1, the second value K2, and the average value of the first value K1 and the second value K2.

In a case where the difference dK of the first value K1 and the second value K2 is determined as not falling within the predetermined range rK in step S53, the controller 52 proceeds to step S54. In step S54, the controller 52 performs a predetermined operation with the human-powered vehicle component 30 and then terminates the process. For example, the controller 52 stops at least one of the motor 32, the actuator 42, the actuator 44, and the actuator 46.

Sixth Embodiment

Figure 8:
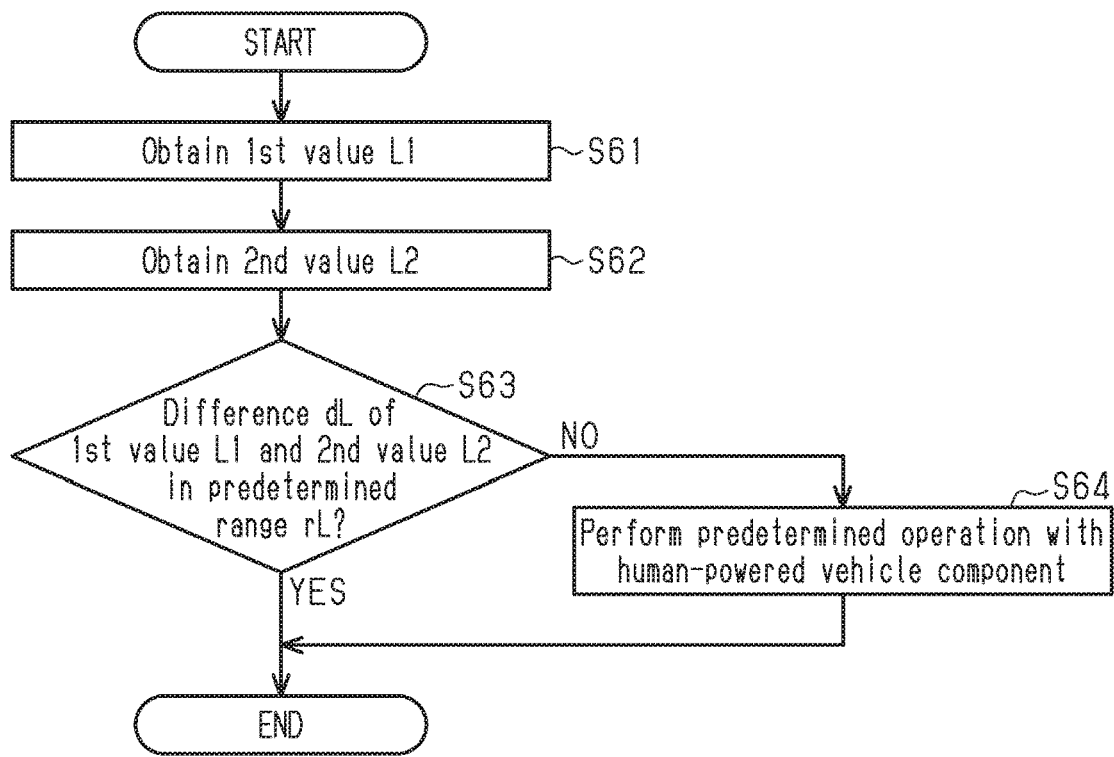
FIG. 8 is a flowchart of a process for controlling a human-powered vehicle component executed by an electronic controller in accordance with a sixth embodiment.

The control device 50 of a sixth embodiment will now be described with reference to FIGS. 2 and 8. The control device 50 of the sixth embodiment is similar to the control device 50 of the second embodiment except in that the human-powered vehicle component 30 performs a predetermined operation in a case where the difference dL of the first value L1 and the second value L2 does not fall within the predetermined range rL. Thus, same reference numerals are given to those components that are the same as the corresponding components of the first embodiment. Such components will not be described in detail.

In a case where the difference dL of the first value L1 and the second value L2 does not fall within the predetermined range rL, the controller 52 performs the predetermined operation with the human-powered vehicle component 30. In a case where the difference dL of the first value L1 and the second value L2 does not fall within the predetermined range rL, the controller 52 performs the predetermined operation with at least one of the motor 32, the actuator 42, the actuator 44, and the actuator 46. In one example, the predetermined operation includes stopping the motor 32, stopping the actuator 42, stopping the actuator 44, and stopping the actuator 46.

The process for controlling the human-powered vehicle component 30 will now be described with reference to FIG. 8. In a case where power is supplied from the battery 28 to the controller 52, the controller 52 starts the process and proceeds to step S61 of the flowchart shown in FIG. 8. As long as power is supplied, the controller 52 performs the process from step S61 in predetermined cycles.

In step S61, the controller 52 obtains the first value L1 and proceeds to step S62. In step S62, the controller 52 obtains the second value L2 and proceeds to step S63. The order of step S61 and step S62 can be reversed. In step S63, the controller 52 determines whether or not the difference dL of the first value L1 and the second value L2 falls within the predetermined range rL. In a case where the difference dL of the first value L1 and the second value L2 is determined as falling within the predetermined range rL, the controller 52 terminates the process. In this case, the controller 52 operates the human-powered vehicle component 30 in accordance with the first value L1 and the second value L2. For example, the controller 52 controls at least one of the motor 32, the actuator 42, the actuator 44, and the actuator 46 in accordance with at least one of the first value L1, the second value L2, and the average value of the first value L1 and the second value L2.

In a case where the difference dL of the first value L1 and the second value L2 is determined as not falling within the predetermined range rL in step S63, the controller 52 proceeds to step S64. In step S64, the controller 52 performs a predetermined operation with the human-powered vehicle component 30 and then terminates the process. For example, the controller 52 stops at least one of the motor 32, the actuator 42, the actuator 44, and the actuator 46.

Seventh Embodiment

The control device 50 of a seventh embodiment will now be described with reference to FIGS. 2 and 9. The control device 50 of the seventh embodiment is similar to the control device 50 of the first embodiment except in that the human-powered vehicle component 30 is controlled in accordance with the states of the first sensor 56 and the second sensor 58. Thus, same reference numerals are given to those components that are the same as the corresponding components of the first embodiment. Such components will not be described in detail.

In a case where the first sensor 56 has failed, the controller 52 controls the human-powered vehicle component 30 in accordance with the second value K2. In a case where the first sensor 56 has failed, the controller 52 controls at least one of the motor 32, the actuator 42, the actuator 44, and the actuator 46 in accordance with the second value K2. In a case where the second sensor 58 has failed, the controller 52 controls the human-powered vehicle component 30 in accordance with the first value K1. In a case where the second sensor 58 has failed, the controller 52 controls at least one of the motor 32, the actuator 42, the actuator 44, and the actuator 46 in accordance with the first value K1. In a case where the first sensor 56 and the second sensor 58 have failed, the controller 52 does not operate the human-powered vehicle component 30 in accordance with the first value K1 and the second value K2. In a case where the first sensor 56 and the second sensor 58 have failed, the controller 52 does not operate at least one of the motor 32, the actuator 42, the actuator 44, and the actuator 46 in accordance with the first value K1 and the second value K2.

The process for controlling the human-powered vehicle component 30 will now be described with reference to FIG. 9. In a case where power is supplied from the battery 28 to the controller 52, the controller 52 starts the process and proceeds to step S71 of the flowchart shown in FIG. 9. As long as power is supplied, the controller 52 performs the process from step S71 in predetermined cycles.

In step S71, the controller 52 determines whether or not the first sensor 56 has failed. For example, in a case where the output of the first sensor 56 is greater than or equal to a first threshold value and in a case where the output is smaller than or equal to a second threshold value smaller than the first threshold value, the controller 52 determines that the first sensor 56 has failed. Furthermore, an abnormality detection unit configured to detect an abnormality can be provided on the first sensor 56 so that an abnormality detection signal is output to the controller 52 in a case where the abnormality detection unit detects an abnormality in the first sensor 56. The abnormality detection signal allows the controller 52 to determine that the first sensor 56 has failed. If the controller 52 determines that the first sensor 56 has not failed, the controller 52 proceeds to step S72.

In step S72, the controller 52 determines whether or not the second sensor 58 has failed. For example, in a case where the output of the second sensor 58 is greater than or equal to a third threshold value and in a case where the output is smaller than or equal to a fourth threshold value, which is smaller than the third threshold value, the controller 52 determines that the second sensor 58 has failed. Furthermore, an abnormality detection unit configured to detect an abnormality can be provided on the second sensor 58 so that an abnormality detection signal is output to the controller 52 in a case where the abnormality detection unit detects an abnormality in the second sensor 58. The abnormality detection signal allows the controller 52 to determine that the second sensor 58 has failed. If the controller 52 determines that the second sensor 58 has not failed, the controller 52 proceeds to step S73. In step S73, the controller 52 controls the human-powered vehicle component 30 in accordance with the average value of the first value K1 and the second value K2 and then terminates the process.

In a case where failure of the second sensor 58 is determined in step S72, the controller 52 proceeds to step S74. In step S74, the controller 52 controls the human-powered vehicle component 30 in accordance with the first value K1 and then terminates the process.

In a case where failure of the first sensor 56 is determined in step S71, the controller 52 proceeds to step S75. In step S75, the controller 52 determines whether or not the second sensor 58 has failed. If the controller 52 determines that the second sensor 58 has not failed, the controller 52 proceeds to step S76. In step S76, the controller 52 controls the human-powered vehicle component 30 in accordance with the second value K2 and terminates the process.

In a case where failure of the second sensor 58 is determined in step S75, the controller 52 proceeds to step S77. In step S77, the controller 52 restricts the operation of the human-powered vehicle component 30 that is in accordance with the first value K1 and the second value K2, and then terminates the process.

Eighth Embodiment

The control device 50 of an eighth embodiment will now be described with reference to FIGS. 2 and 10. The control device 50 of the eighth embodiment is similar to the control device 50 of the second embodiment except in that the human-powered vehicle component 30 is controlled in accordance with the states of the first sensor 56 and the second sensor 58. Thus, same reference numerals are given to those components that are the same as the corresponding components of the first embodiment. Such components will not be described in detail.

In a case where the first sensor 56 has failed, the controller 52 controls the human-powered vehicle component 30 in accordance with the second value L2. In a case where the first sensor 56 has failed, the controller 52 controls at least one of the motor 32, the actuator 42, the actuator 44, and the actuator 46 in accordance with the second value L2. In a case where the second sensor 58 has failed, the controller 52 controls the human-powered vehicle component 30 in accordance with the first value L1. In a case where the second sensor 58 has failed, the controller 52 controls at least one of the motor 32, the actuator 42, the actuator 44, and the actuator 46 in accordance with the first value L1. In a case where the first sensor 56 and the second sensor 58 have failed, the controller 52 does not operate the human-powered vehicle component 30 in accordance with the first value L1 and the second value L2. In a case where the first sensor 56 and the second sensor 58 have failed, the controller 52 does not operate at least one of the motor 32, the actuator 42, the actuator 44, and the actuator 46 in accordance with the first value L1 and the second value L2.

The process for controlling the human-powered vehicle component 30 will now be described with reference to FIG. 10. In a case where power is supplied from the battery 28 to the controller 52, the controller 52 starts the process and proceeds to step S81 of the flowchart shown in FIG. 10. As long as power is supplied, the controller 52 performs the process from step S81 in predetermined cycles.

In step S81, the controller 52 determines whether or not the first sensor 56 has failed. If the controller 52 determines that the first sensor 56 has not failed, the controller 52 proceeds to step S82.

In step S82, the controller 52 determines whether or not the second sensor 58 has failed. If the controller 52 determines that the second sensor 58 has not failed, the controller 52 proceeds to step S83. In step S83, the controller 52 controls the human-powered vehicle component 30 in accordance with the average value of the first value L1 and the second value L2 and then terminates the process.

In a case where failure of the second sensor 58 is determined in step S82, the controller 52 proceeds to step S84. In step S84, the controller 52 controls the human-powered vehicle component 30 in accordance with the first value L1 and then terminates the process.

In a case where failure of the first sensor 56 is determined in step S81, the controller 52 proceeds to step S85. In step S85, the controller 52 determines whether or not the second sensor 58 has failed. If the controller 52 determines that the second sensor 58 has not failed, the controller 52 proceeds to step S86. In step S86, the controller 52 controls the human-powered vehicle component 30 in accordance with the second value L2 and then terminates the process.

In a case where failure of the second sensor 58 is determined in step S85, the controller 52 proceeds to step S87. In step S87, the controller 52 restricts the operation of the human-powered vehicle component 30 that is in accordance with the first value L1 and the second value L2 and then terminates the process.

Ninth Embodiment

The control device 50 of a ninth embodiment will now be described with reference to FIGS. 2 and 11. The control device 50 of the ninth embodiment is similar to the control device 50 of the first embodiment except in that the human-powered vehicle component 30 is controlled in accordance with the state of the wind sensor 64. Thus, same reference numerals are given to those components that are the same as the corresponding components of the first embodiment. Such components will not be described in detail.

The controller 52 is configured to control the human-powered vehicle component 30 in accordance with the output of the wind sensor 64. The controller 52 is configured to control at least one of the motor 32, the actuator 42, the actuator 44, and the actuator 46 in accordance with the output of the wind sensor 64. In a case where the output of the wind sensor 64 satisfies the predetermined condition, the controller 52 does not operate the human-powered vehicle component 30 in accordance with the output of the wind sensor 64. In a case where the output of the wind sensor 64 satisfies the predetermined condition, the controller 52 does not operate at least one of the motor 32, the actuator 42, the actuator 44, and the actuator 46 in accordance with the output of the wind sensor 64. In a case where the output of the wind sensor 64 satisfies the predetermined condition, the controller 52 controls the human-powered vehicle component 30 so that the human-powered vehicle component 30 becomes a predetermined state. In a case where the output of the wind sensor 64 satisfies the predetermined condition, the controller 52 controls at least one of the motor 32, the actuator 42, the actuator 44, and the actuator 46 so that at least one of the motor 32, the actuator 42, the actuator 44, and the actuator 46 becomes a predetermined state. The predetermined state includes a state in which the motor 32 is stopped, a state in which the actuator 42 is stopped, a state in which the actuator 44 is stopped, and a state in which the actuator 46 is stopped. The predetermined condition includes at least one of the change amount of the output of the wind sensor 64 in a first predetermined time being greater than or equal to a first change amount, the change amount of the output of the wind sensor 64 in a second predetermined time being smaller than or equal to a second change amount, and the output of the wind sensor 64 being greater than or equal to a predetermined value. In one example, the predetermined condition includes every one of the change amount of the output of the wind sensor 64 in a first predetermined time being greater than or equal to a first change amount, the change amount of the output of the wind sensor 64 in a second predetermined time being smaller than or equal to a second change amount, and the output of the wind sensor 64 being greater than or equal to a predetermined value. In another example, the predetermined condition includes one or two of the change amount of the output of the wind sensor 64 in a first predetermined time being greater than or equal to a first change amount, the change amount of the output of the wind sensor 64 in a second predetermined time being smaller than or equal to a second change amount, and the output of the wind sensor 64 being greater than or equal to a predetermined value.

The process for controlling the human-powered vehicle component 30 will now be described with reference to FIG. 11. In a case where power is supplied from the battery 28 to the controller 52, the controller 52 starts the process and proceeds to step S91 of the flowchart shown in FIG. 11. As long as power is supplied, the controller 52 performs the process from step S91 in predetermined cycles.

In step S91, the controller 52 obtains the output of the wind sensor 64, and proceeds to step S92. In step S92, the controller 52 determines whether or not the output of the wind sensor 64 satisfies a predetermined condition. Specifically, in a case where the change amount of the output of the wind sensor 64 in a first predetermined time is greater than or equal to a first change amount, the change amount of the output of the wind sensor 64 in a second predetermined time is smaller than or equal to a second change amount, and the output of the wind sensor 64 is greater than or equal to a predetermined value, the controller 52 determines that the output of the wind sensor 64 satisfies the predetermined condition. In a case where the change amount of the output of the wind sensor 64 in a first predetermined time is not greater than or equal to a first change amount, the change amount of the output of the wind sensor 64 in a second predetermined time is not smaller than or equal to a second change amount, and the output of the wind sensor 64 is not greater than or equal to a predetermined value, the controller 52 determines that the output of the wind sensor 64 does not satisfy the predetermined condition.

In a case where the output of the wind sensor 64 is determined as not satisfying the predetermined condition in step S92, the controller 52 proceeds to step S93. In step S93, the controller 52 permits the operation of the human-powered vehicle component 30 that is in accordance with the output of the wind sensor 64. For example, the controller 52 permits the operation of the human-powered vehicle component 30 that is in accordance with the output of the wind sensor 64 by canceling the restriction flag of the operation of the human-powered vehicle component 30 and then terminates the process. In a case where the restriction flag of the operation of the human-powered vehicle component 30 is not set, the controller 52 operates the human-powered vehicle component 30 in accordance with the output of the wind sensor 64.

In a case where the output of the wind sensor 64 is determined as satisfying the predetermined condition in step S92, the controller 52 proceeds to step S94. In step S94, the controller 52 restricts the operation of the human-powered vehicle component 30 that is in accordance with the output of the wind sensor 64. For example, the controller 52 restricts the operation of the human-powered vehicle component 30 that is in accordance with the output of the wind sensor 64 by setting a restriction flag of the operation of the human-powered vehicle component 30. In a case where the restriction flag of the operation of the human-powered vehicle component 30 is set, the controller 52 does not operate the human-powered vehicle component 30 in accordance with the output of the wind sensor 64.

Upon completion of step S94, the controller 52 proceeds to step S95. In step S95, the controller 52 controls the human-powered vehicle component 30 so that the human-powered vehicle component 30 becomes a predetermined state and then terminates the process. For example, the controller 52 stops the operation of the human-powered vehicle component 30 in step S95.

Modifications

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 12:
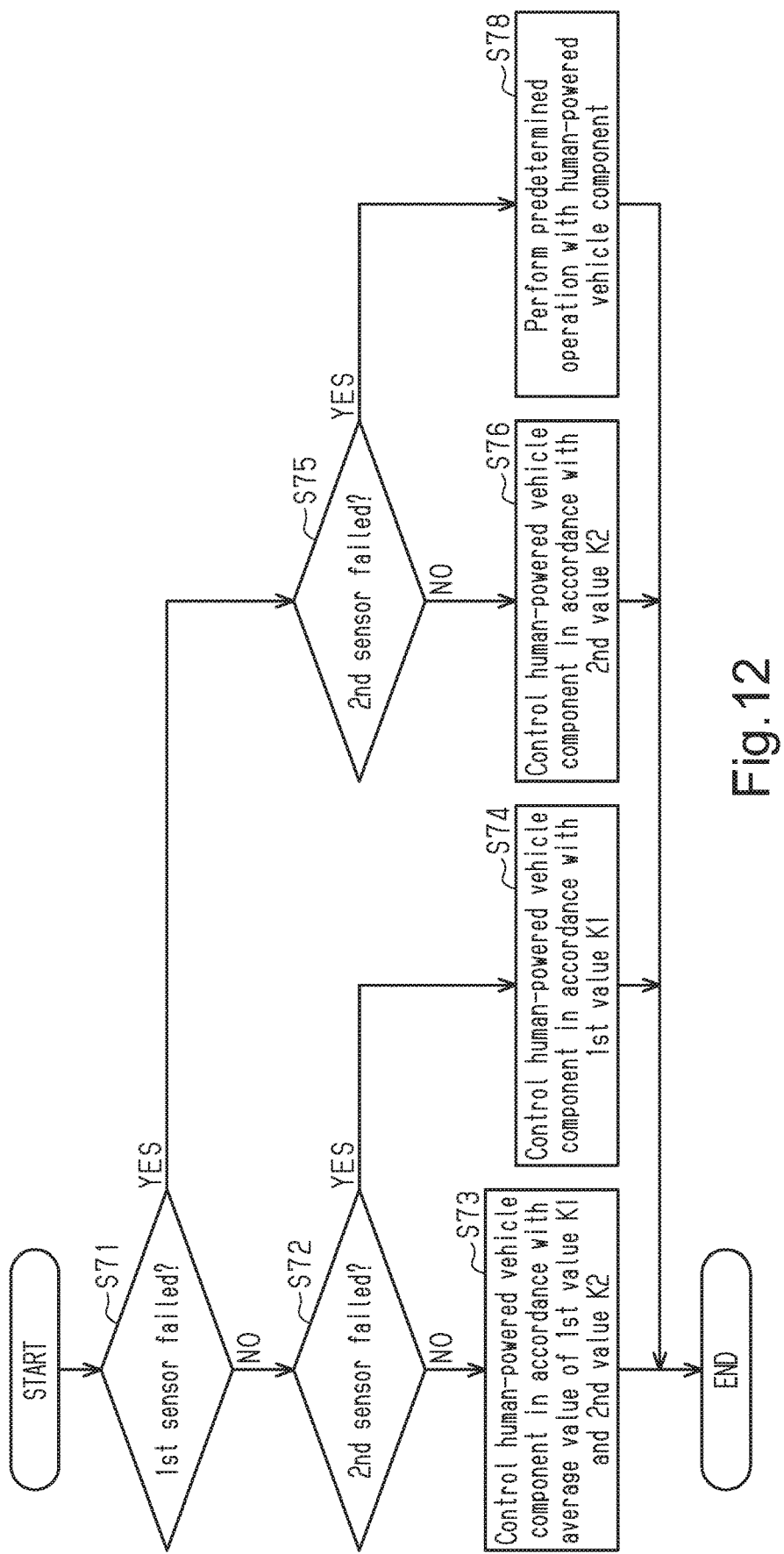
FIG. 12 is a flowchart of a process for controlling a human-powered vehicle component executed by an electronic controller in accordance with a modification of the seventh embodiment.

In the seventh embodiment, in a case where the first sensor 56 and the second sensor 58 have failed, the controller 52 can perform a predetermined operation with the human-powered vehicle component 30. In this case, the process of step S78 of FIG. 12 can be performed instead of the process of step S77 of FIG. 9. In step S78, the controller 52 performs the predetermined operation with the human-powered vehicle component 30. For example, the controller 52 stops at least one of the motor 32, the actuator 42, the actuator 44, and the actuator 46.

Figure 13:
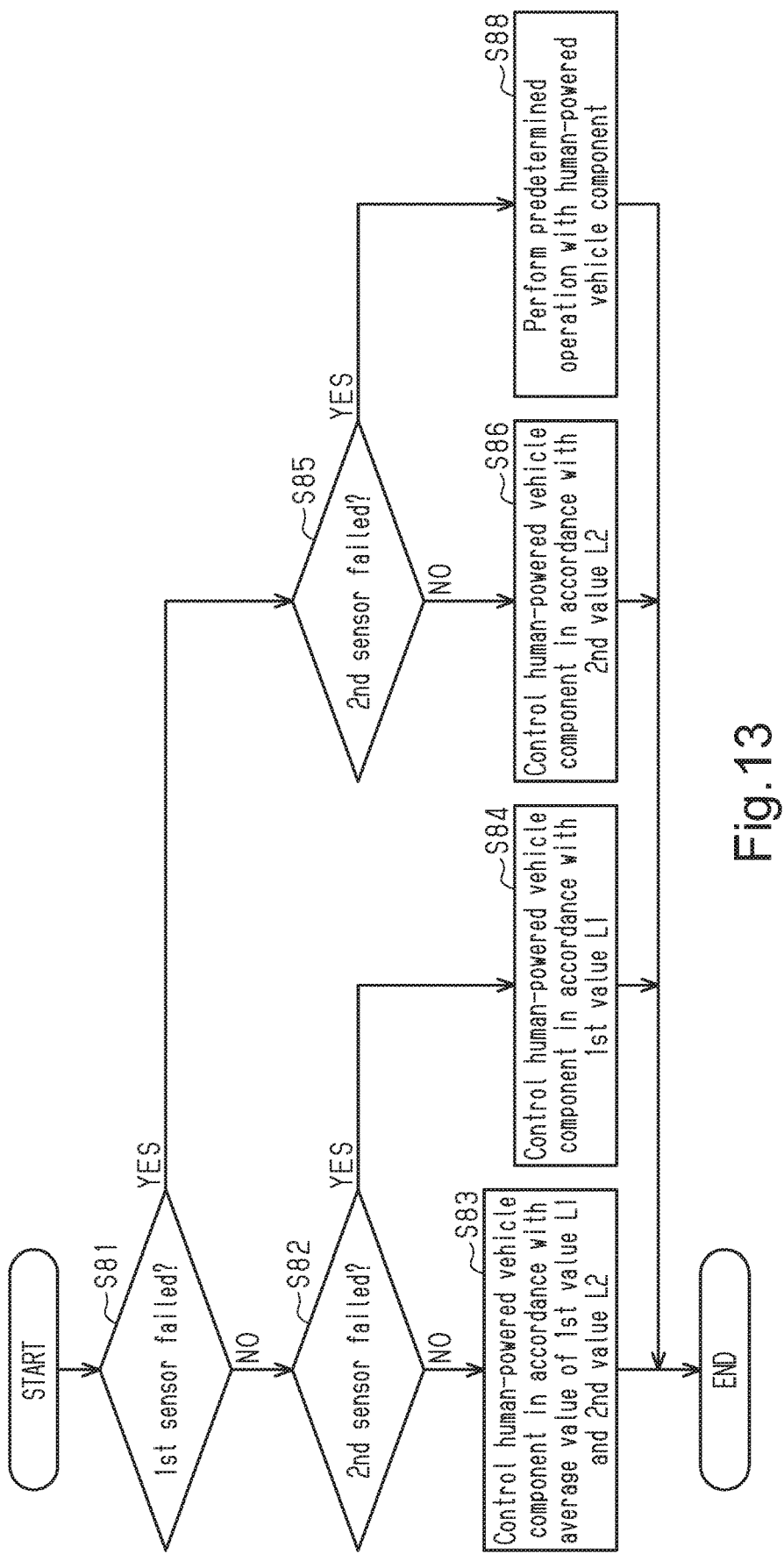
FIG. 13 is a flowchart of a process for controlling a human-powered vehicle component executed by an electronic controller in accordance with a modification of the eighth embodiment.

In the eighth embodiment, in a case where the first sensor 56 and the second sensor 58 have failed, the controller 52 can perform a predetermined operation with the human-powered vehicle component 30. In this case, the process of step S88 of FIG. 13 can be performed instead of the process of step S87 of FIG. 10. In step S88, the controller 52 performs a predetermined operation with the human-powered vehicle component 30. For example, the controller 52 stops at least one of the motor 32, the actuator 42, the actuator 44, and the actuator 46.

Figure 5:
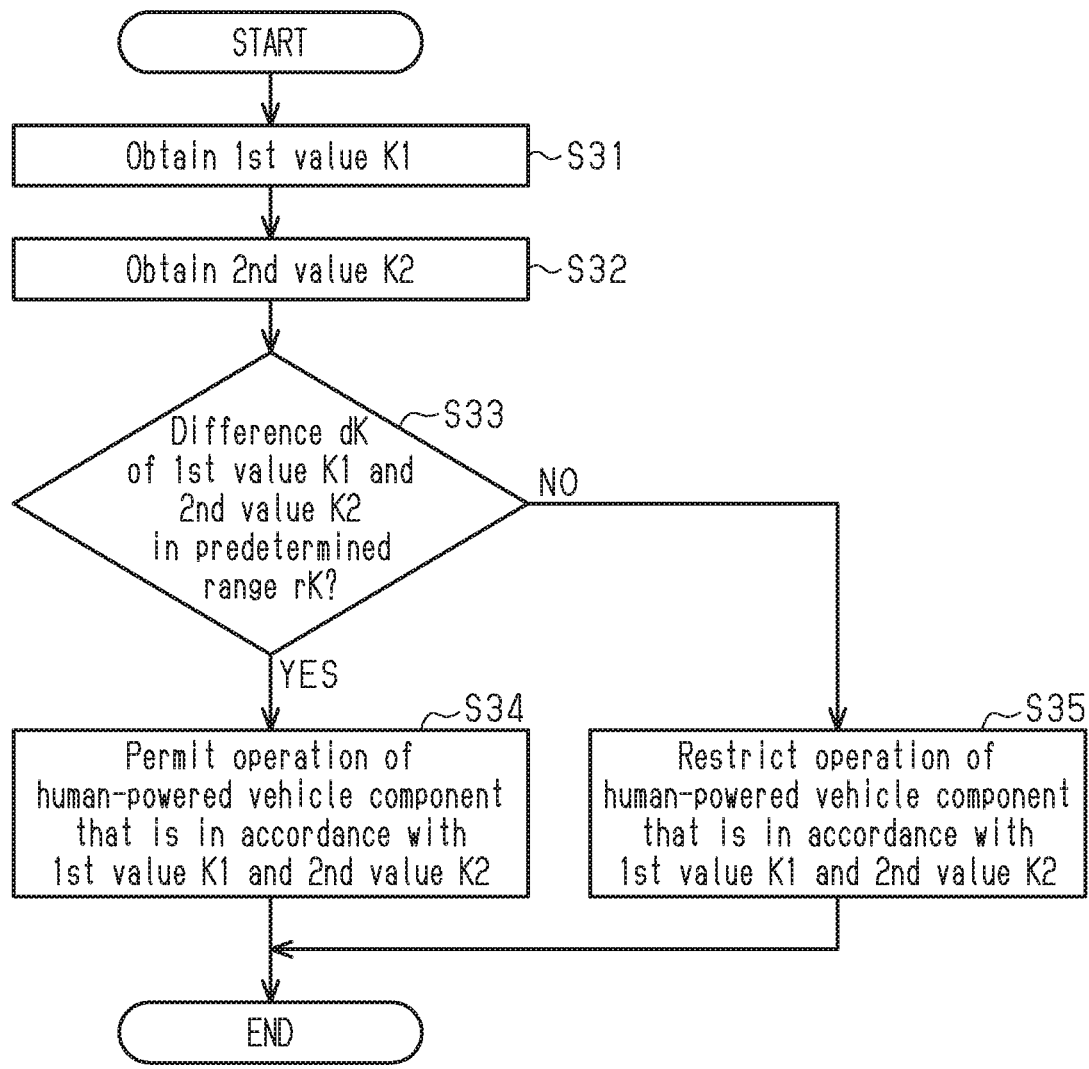
FIG. 5 is a flowchart of a process for controlling a human-powered vehicle component executed by an electronic controller in accordance with a third embodiment.

The process of step S34 can be omitted from FIG. 5 of the fourth embodiment. In this case, for example, the restriction flag of the operation of the human-powered vehicle component 30 can be canceled by operating an operation unit of the human-powered vehicle 10 or an external device.

Figure 6:
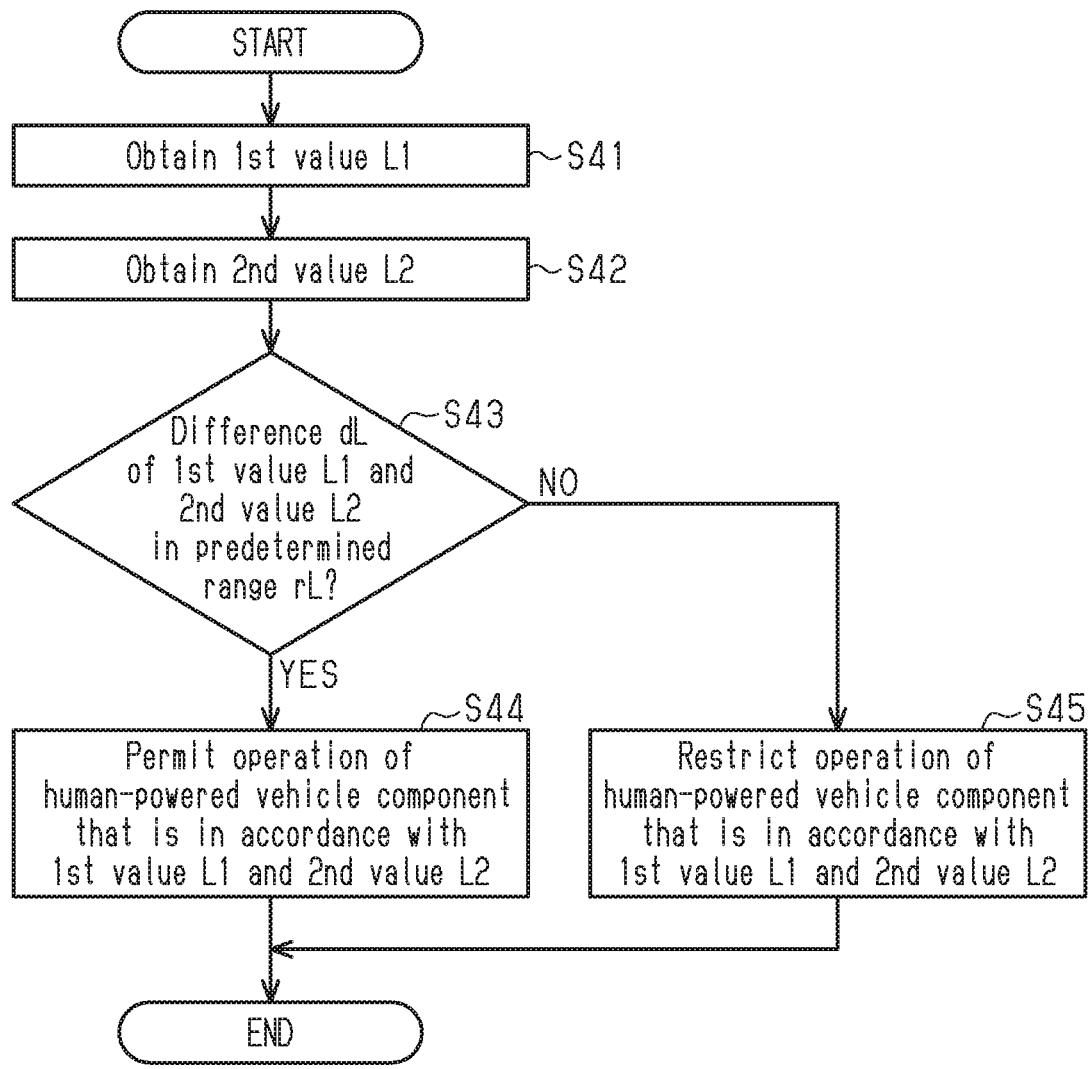
FIG. 6 is a flowchart of a process for controlling a human-powered vehicle component executed by an electronic controller in accordance with a fourth embodiment.

The process of step S44 can be omitted from FIG. 6 of the fifth embodiment. In this case, for example, the restriction flag of the operation of the human-powered vehicle component 30 can be canceled by operating the operation unit of the human-powered vehicle 10 or an external device.

Figure 11:
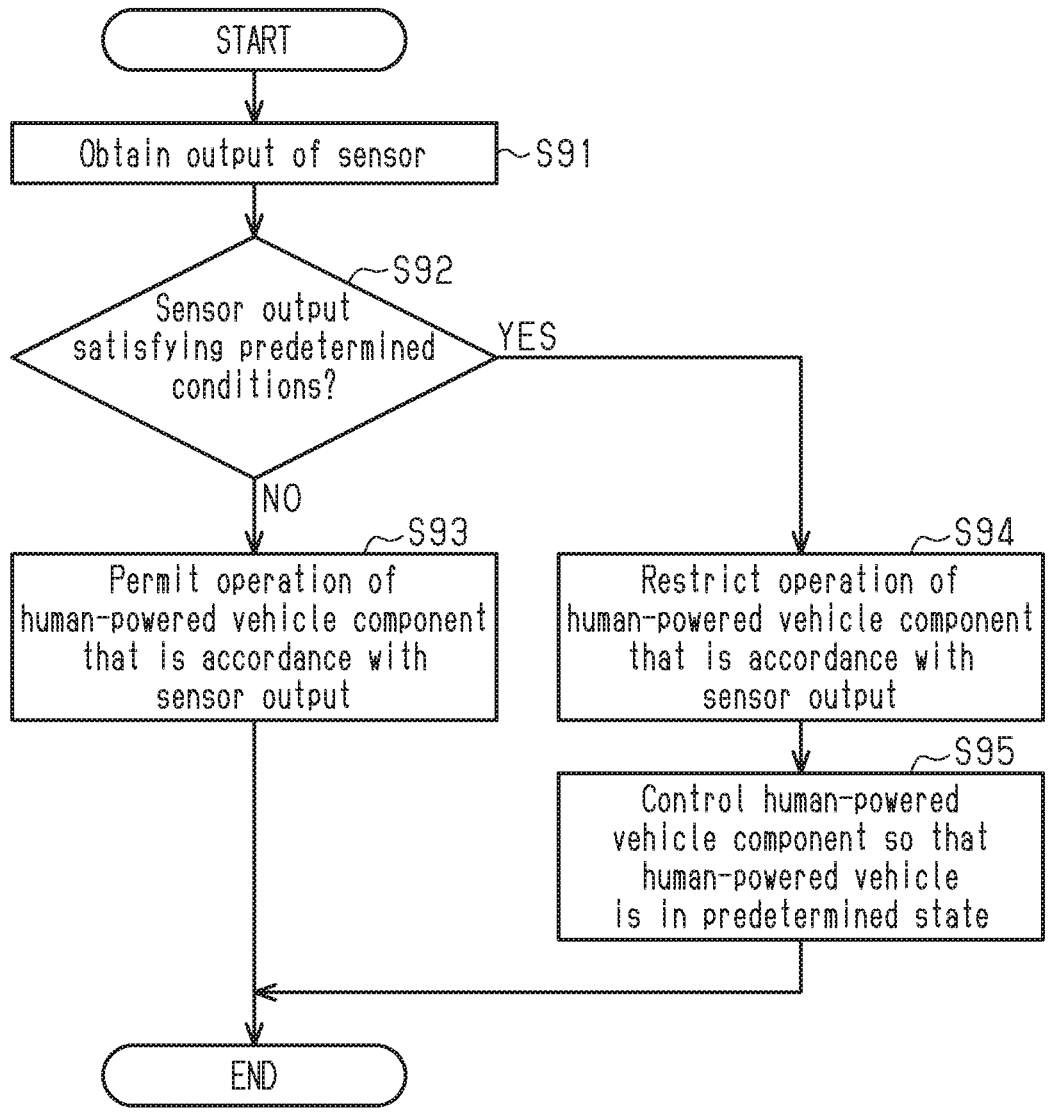
FIG. 11 is a flowchart of a process for controlling a human-powered vehicle component executed by an electronic controller in accordance with a ninth embodiment.

The process of step S93 can be omitted from FIG. 11 of the ninth embodiment. In this case, for example, the restriction flag of the operation of the human-powered vehicle component 30 can be canceled by operating the operation unit of the human-powered vehicle 10 or an external device.

Figure 3:
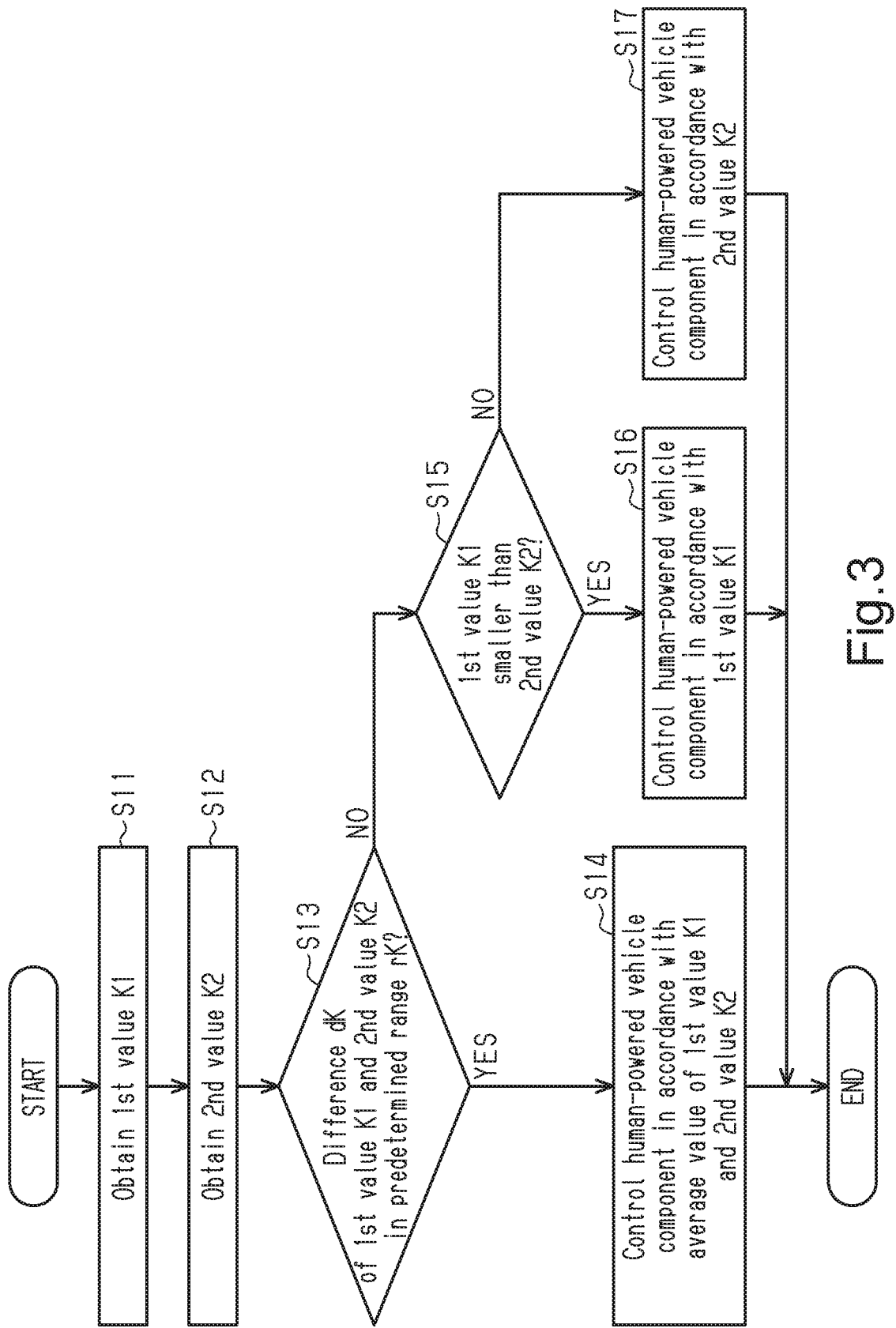
FIG. 3 is a flowchart of a process for controlling a human-powered vehicle component executed by an electronic controller of FIG. 2.
Figure 9:
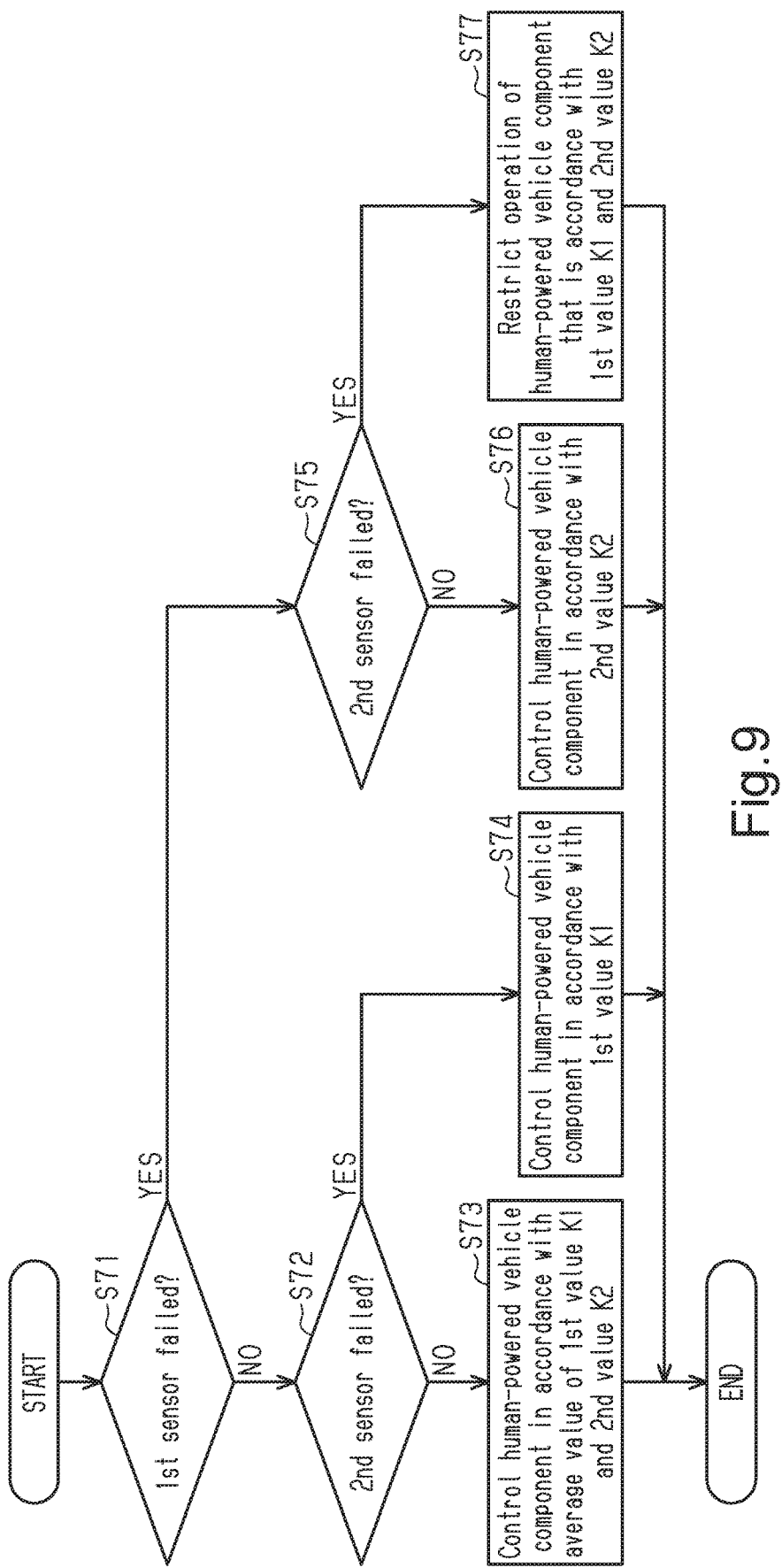
FIG. 9 is a flowchart of a process for controlling a human-powered vehicle component executed by an electronic controller in accordance with a seventh embodiment.

In the processes of step S14 of FIG. 3 of the first embodiment, step S73 of FIG. 9 of the seventh embodiment, and similar steps of the modifications, the human-powered vehicle component 30 can be controlled in accordance with one of the first value K1 and the second value K2. The difference dK of the first value K1 and the second value K2 also falls within the predetermined range rK in this case. Thus, the reliability of both the first value K1 and the second value K2 is high.

Figure 4:
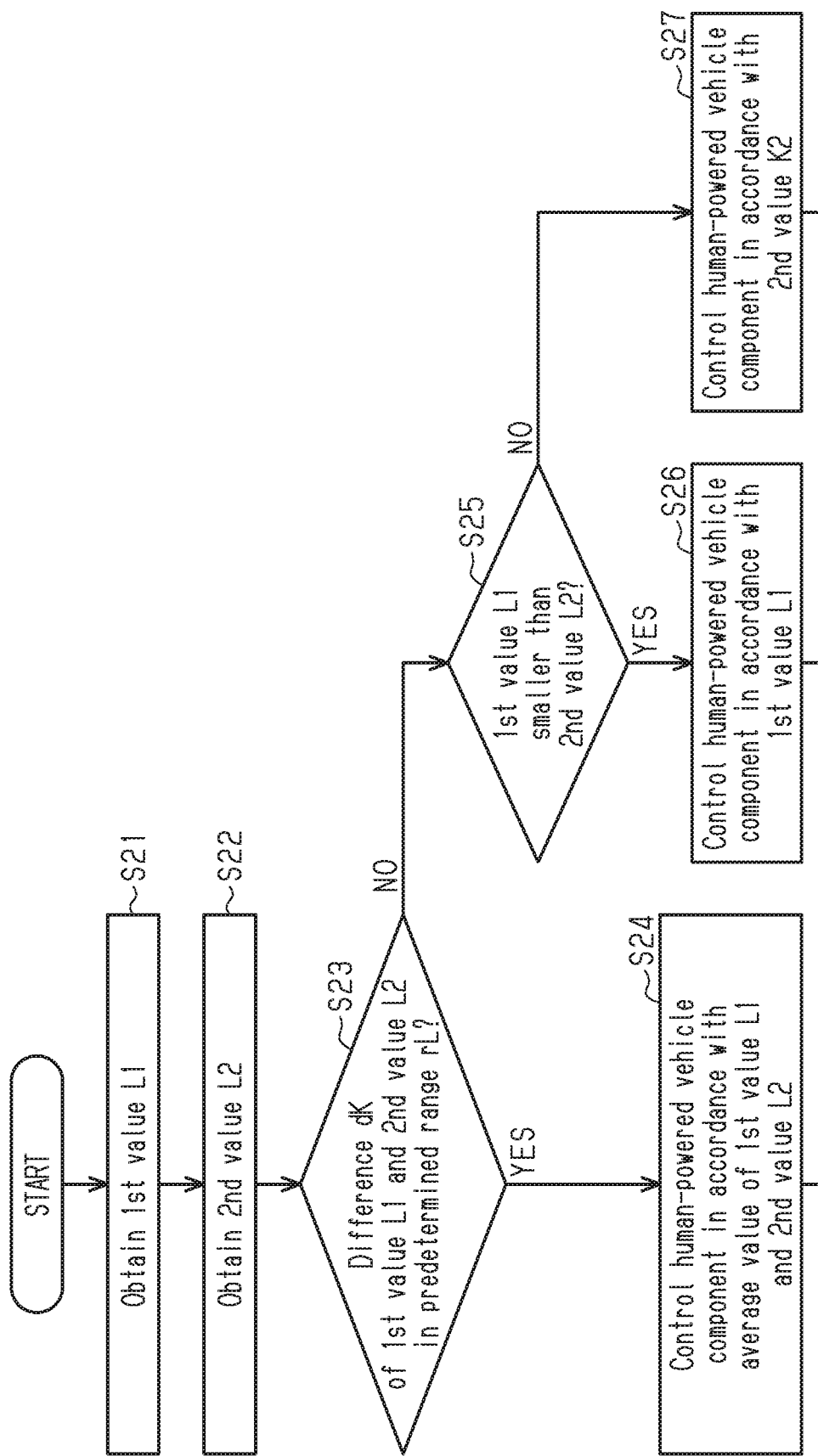
FIG. 4 is a flowchart of a process for controlling a human-powered vehicle component executed by an electronic controller in accordance with a second embodiment.
Figure 10:
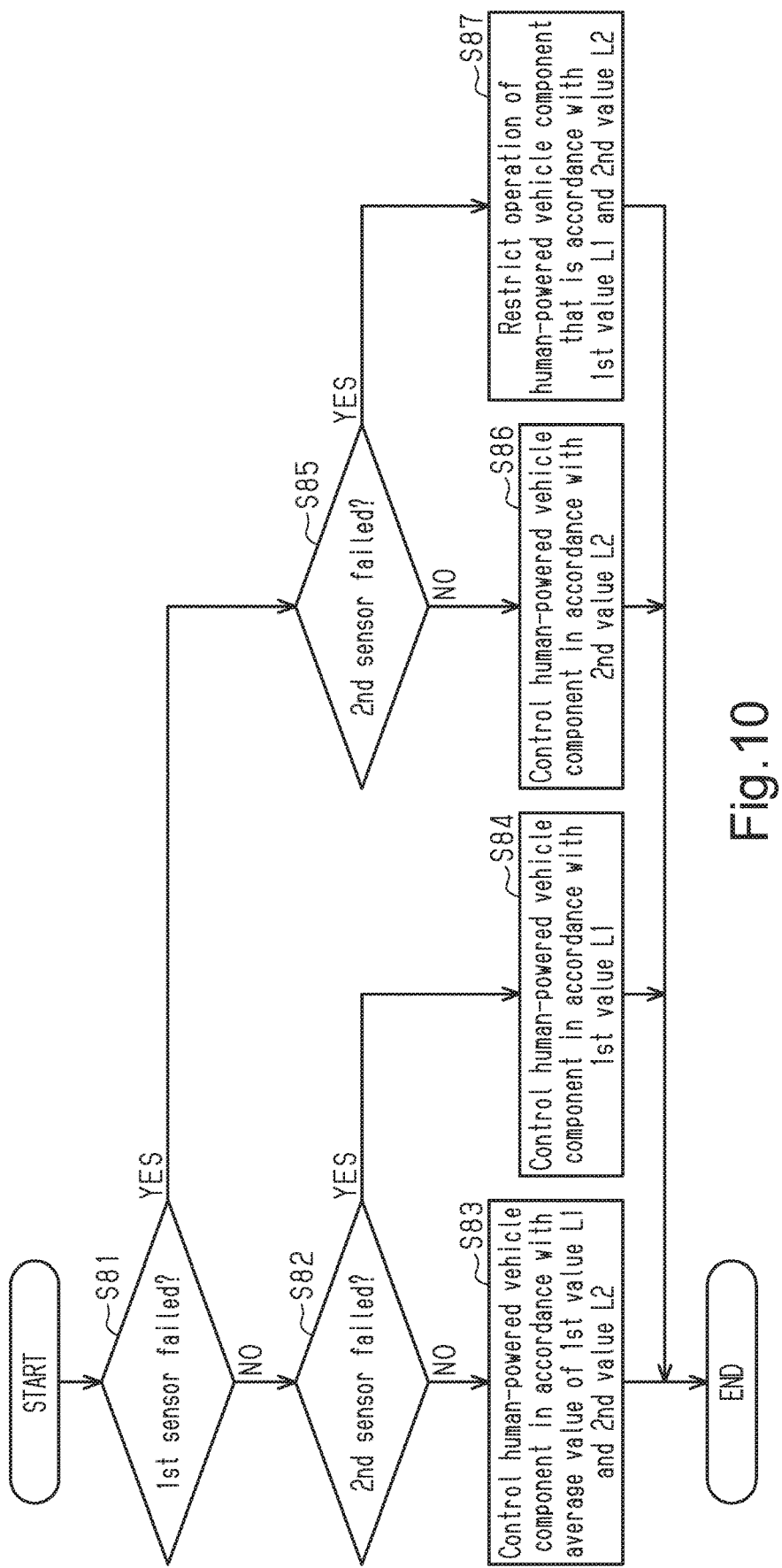
FIG. 10 is a flowchart of a process for controlling a human-powered vehicle component executed by an electronic controller in accordance with an eighth embodiment.

In the processes of step S24 of FIG. 4 of the second embodiment, step S83 of FIG. 10 of the eighth embodiment, and similar steps of the modifications, the human-powered vehicle component 30 can be controlled in accordance with one of the first value L1 and the second value L2. In this case, the difference dL of the first value L1 and the second value L2 also falls within the predetermined range rL. Thus, the reliability of both the first value L1 and the second value L2 is high.

The process of step S95 can be omitted from FIG. 11 of the ninth embodiment. In this case, the controller 52 restricts the operation of the human-powered vehicle component 30 that is in accordance with the output of the wind sensor 64 in step S94 and then terminates the process.

In each embodiment, the travel resistance RY can include just one of the air resistance R1, the rolling resistance R2 of the wheels of the human-powered vehicle 10 and the gradient resistance R3 of the traveling road of the human-powered vehicle 10, and the travel resistance R can include just two of the air resistance R1, the rolling resistance R2 of the wheel of the human-powered vehicle 10, and the gradient resistance R3 of the traveling road of the human-powered vehicle 10. In this case, the calculation load on the controller 52 can be reduced, and the sensor necessary for calculating the travel resistance RY can be omitted. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
an electronic controller configured to control a human-powered vehicle component included in a human-powered vehicle in accordance with a human driving force,
the electronic controller being configured to control the human-powered vehicle component in accordance with at least one of a difference between a first value and a second value and an average value of the first value and the second value, the first value being related to one of the human driving force and a driving force of the human-powered vehicle obtained using a first sensor, and the second value being related to one of the human driving force and the driving force of the human-powered vehicle obtained using a second sensor, which differs from the first sensor.

2. The human-powered vehicle control device according to claim 1, wherein
the first sensor includes a crank torque sensor that detects a torque input to a crank of the human-powered vehicle, and
the second sensor includes at least one of a wind sensor that detects at least one of wind speed and wind pressure, an acceleration sensor that detects acceleration of the human-powered vehicle, a vehicle speed sensor that detects vehicle speed of the human-powered vehicle, an inclination sensor that detects tilt of the human-powered vehicle, and a torque sensor.

3. A human-powered vehicle control device comprising:
an electronic controller configured to control a human-powered vehicle component included in a human-powered vehicle in accordance with a human driving force,
the electronic controller being configured to control the human-powered vehicle component in accordance with a first value and a second value, the first value being related to one of the human driving force and a driving force of the human-powered vehicle obtained using a first sensor, and the second Value being related to one of the human driving force and the driving force of the human-powered vehicle obtained using a second sensor, which differs from the first sensor,
the electronic controller further configured to control the human-powered vehicle component in accordance with a smaller one of the first value and the second value upon determining a difference of the first value and the second value is excluded from a predetermined range.

4. The human-powered vehicle control device according to claim 1, wherein
the electronic controller is configured not to operate the human-powered vehicle component in accordance with the first value and the second value upon determining a difference of the first value and the second value is excluded from a predetermined range.

5. The human-powered vehicle control device according to claim 1, wherein
the electronic controller is configured to perform a predetermined operation with the human-powered vehicle component upon determining the difference of the first value and the second value is excluded from a predetermined range.

6. The human-powered vehicle control device according to claim 1, wherein
the electronic controller is configured to control the human-powered vehicle component in accordance with the second value upon determining the first sensor has failed, and
the electronic controller is configured to control the human-powered vehicle component in accordance with the first value upon determining the second sensor has failed.

7. The human-powered vehicle control device according to claim 1, wherein
the electronic controller is configured not to operate the human-powered vehicle component in accordance with the first value and the second value upon determining the first sensor and the second sensor have failed.

8. The human-powered vehicle control device according to claim 1, wherein
the electronic controller is configured to perform a predetermined operation with the human-powered vehicle component upon determining the first sensor and the second sensor have failed.

9. The human-powered vehicle control device according to claim 1, wherein
the human-powered vehicle component includes at least one of a motor that assists in propulsion of the human-powered vehicle, a transmission, a suspension, and an adjustable seatpost.

10. The human-powered vehicle control device according to claim 1, wherein
the electronic controller is configured to control the human-powered vehicle component in accordance with in accordance with an average of the first value and the second value based on the difference between the first value and the second value.

* * * * *